United States Patent
Marathe et al.

(10) Patent No.: US 9,430,275 B2
(45) Date of Patent: Aug. 30, 2016

(54) SYNCHRONIZATION BETWEEN CONCURRENT NOTIFIER AND WAITER TRANSACTIONS USING TRANSACTION CONDITION VARIABLES

(75) Inventors: Virendra J. Marathe, Florence, MA (US); Victor M. Luchangco, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 763 days.

(21) Appl. No.: 13/170,026

(22) Filed: Jun. 27, 2011

(65) Prior Publication Data

US 2012/0311273 A1 Dec. 6, 2012

Related U.S. Application Data

(60) Provisional application No. 61/493,290, filed on Jun. 3, 2011.

(51) Int. Cl.
G06F 9/455 (2006.01)
G06F 9/46 (2006.01)

(52) U.S. Cl.
CPC .................................. G06F 9/467 (2013.01)

(58) Field of Classification Search
None
See application file for complete search history.

(56) References Cited

U.S. PATENT DOCUMENTS 7,475,226 B2 * 1/2009 Le et al. ........................ 712/218
7,720,891 B2 5/2010 Luchangco et al.
2003/0023656 A1 * 1/2003 Hutchison et al. ............ 709/100
2004/0015642 A1 * 1/2004 Moir et al. .......................... 711/1
2007/0083569 A1 4/2007 Wong et al.
2007/0198518 A1 * 8/2007 Luchangco et al. ............... 707/8
2010/0162249 A1 6/2010 Shpeisman et al.
2011/0078697 A1 * 3/2011 Smittle et al. ................. 718/104

OTHER PUBLICATIONS

A.-R. Adl-Tabatabai, B. T. Lewis, V. Menon, B. R. Murphy, B. Saha, and T. Shpeisman. Compiler and runtime support for efficient software transactional memory. In Proceedings of the ACM SIGPLAN Conference on Programming Language, Design and Implementation, pp. 26-37, 2006.

(Continued)

*Primary Examiner* — Meng An
*Assistant Examiner* — Bradley Teets
(74) *Attorney, Agent, or Firm* — Robert C. Kowert; Meyertons, Hood, Kivlin, Kowert & Goetzel, P.C.

(57) ABSTRACT

Transactional memory implementations may be extended to support transaction communicators and/or transaction condition variables for which transaction isolation is relaxed, and through which concurrent transactions can communicate and be synchronized with each other. Transactional accesses to these objects may not be isolated unless called within communicator-isolating transactions. A waiter transaction may invoke a wait method of a transaction condition variable, be added to a wait list for the variable, and be suspended pending notification of a notification event from a notify method of the variable. A notifier transaction may invoke a notify method of the variable, which may remove the waiter from the wait list, schedule the waiter transaction for resumed execution, and notify the waiter of the notification event. A waiter transaction may commit only if the corresponding notifier transaction commits. If the waiter transaction aborts, the notification may be forwarded to another waiter.

20 Claims, 9 Drawing Sheets

(56) References Cited

OTHER PUBLICATIONS

H.-J. Boehm. Transactional memory should be an implementation technique, not a programming interface. In Proceedings of the 1st USENIX Workshop on Hot Topics in Parallelism, 2009, 6 pages.

P. Dudnik and M. M. Swift. Condition variables and transactional memory: Problem or opportunity? In Proceedings of the 4th ACM SIGPLAN Workshop on Transactional Computing, 2009, 10 pages.

T. Harris and K. Fraser. Language support for lightweight transactions. In Proceedings of the 18th Annual ACM SIGPLAN Conference on Object-Oriented Programing, Systems, Languages, and Applications, pp. 388-402, 2003.

T. Harris, S. Marlow, S. Peyton-Jones, and M. Herlihy. Composable memory transactions. In Proceedings of the 10th ACM SIGPLAN Symposium on Principles and Practice of Parallel Programming, pp. 48-60, 2005.

T. Harris, M. Plesko, A. Shinnar, and D. Tarditi. Optimizing memory transactions. In ACM SIGPLAN 2006 Conference on Programming Language Design and Implementation, pp. 14-25, Jun. 2006.

C. A. R. Hoare. Monitors: an operating system structuring concept. Communications of the ACM, 17:549-557, Oct. 1974.

B. W. Lampson and D. D. Redell. Experience with processes and monitors in Mesa. Communications of the ACM, vol. 23, issue 2:105-117, Feb. 1980.

V. Luchangco and V. J. Marathe. Transaction communicators: Enabling cooperation among concurrent transactions. In Proceedings of the 16th ACM Symposium on Principles and Practice of Parallel Programming, pp. 169-178, 2011.

V. Luchangco and V. J. Marathe. Transaction Synchronizers. In Proceedings of the Workshop on Synchronization and Concurrency in Object-Oriented Languages, 2005, 6 pages.

Y. Smaragdakis, A. Kay, R. Behrends, and M. Young. Transactions with isolation and cooperation. In Proceedings of the 22nd Annual ACM SIGPLAN Conference on Object Oriented Programming Systems and Applications, pp. 191-210, 2007.

M. F. Spear, A. Sveikauskas, and M. L. Scott. Transactional Memory Retry Mechanisms. In Proceedings of the 27th ACM Symposium on Principles of Distributed Computing, pp. 453-453, 2008.

Transactional Memory Retry Mechanisms. Michael F. Spear, Andrew Sveikauskas, and Michael L. Scott. Technical Report #935. Department of Computer Science, University of Rochester. Jun. 2008, 7 pages.

\* cited by examiner

SYNCHRONIZATION BETWEEN CONCURRENT NOTIFIER AND WAITER TRANSACTIONS USING TRANSACTION CONDITION VARIABLES

This application claims benefit of priority of U.S. Provisional Application Ser. No. 61/493,290 entitled "System and Method for Synchronization Between Concurrent Transactions Using Transaction Condition Variables," filed Jun. 3, 2011, the content of which is incorporated by reference herein in its entirety.

BACKGROUND

1. Field of the Disclosure

This disclosure relates generally to computer systems that implement transactional memory, and more specifically to a system and methods for synchronizing transactions using a new type of transaction condition variable for which transaction isolation properties are relaxed.

2. Description of the Related Art

Transactional memory is a promising technology to ease programming of multiprocessor systems. With transactional memory, a thread can execute a block of code as a transaction, which may either commit (in which case its effects become visible to other threads) or abort (in which case its effects are discarded). A transactional memory system manages the transactions, ensuring that transactions that commit are isolated (i.e. that each transaction appears as though it were executed without any operations of other transactions being interleaved with its own) and that the transactions appear to be executed in a consistent order (i.e. the transaction order). Thus, a transaction sees the effects of those transactions that precede it in the transaction order, and no transaction sees partial effects of any other transaction.

The isolation property of transactions can greatly simplify concurrent programming. For example, a programmer can consider each transaction separately, rather than having to consider all possible interleavings of its operations with the operations of other transactions. However, isolation can also limit the applicability of transactions. For example, isolated transactions are incompatible with some common synchronization mechanisms, such as barriers and ordinary condition variables. More generally, isolation disallows programming idioms that require communication among transactions while they are active (i.e. not yet committed or aborted).

Locks (which are often used to provide isolation for critical regions of code), and semaphores, (which are sometimes used to order events, e.g., such as the execution of various critical regions), are among the earliest synchronization mechanisms in concurrent programming. Experience has shown that it is not sufficient to have two independent mechanisms. Rather, it is desirable to have structured mechanisms that integrate them, such as monitors (which may employ condition variables). However, current mechanisms do not provide condition synchronization with transactions, that is, a mechanism that integrates transactions and the ordering of events in a manner analogous to condition variables.

Existing proposals for providing such synchronization include (i) conditional critical region (CCR) style transactions (which allow execution of a transaction only if a particular condition is satisfied, and in which the execution of the transaction is delayed until the condition is true); (ii) a retry construct (which aborts a transaction that calls retry, and re-executes it only when something in that transaction's read or write set is modified); and (iii) a wait construct or ordinary condition variable (which "punctuates", i.e., commits, the waiting transaction and begins a new transaction for the waiting thread on receipt of a notification from a concurrent transaction). However, none of these proposals allow synchronous communication (e.g., n-way rendezvous operations) between concurrent transactions.

SUMMARY

The systems and methods described herein may extend transactional memory implementations to support "transaction communicators", and/or "transaction condition variables" which are special objects through which concurrent transactions can communicate and/or synchronize such communication. Transactional accesses to transaction communicators and transaction condition variables may not be isolated, allowing concurrent transactions to communicate and/or synchronize communication with each other by observing and manipulating the state of these objects. In some embodiments, changes made to transaction communicator objects by a first transaction may be visible to concurrent transactions before the first transaction commits. Similarly, a transaction condition variable may include methods (e.g., "wait" and "notify" type methods) that may be invoked within transactions and that may be used to signal other transactions prior to either transaction committing. Although isolation of transactions may be compromised by such communication, the effects of these compromises may be limited by tracking dependencies among transactions, and preventing any transaction from committing unless every transaction on which it depends also commits. In some embodiments, dependencies between waiting and notifying transactions, and true dependencies (e.g., read-after-write dependencies) between transactions that access a shared communicator object may be enforced, while transactions that do not communicate in this manner may remain isolated from each other.

To help programmers synchronize accesses to such communicators, some embodiments may provide a special type of transaction that ensures isolation even for accesses to communicators and transaction condition variables. This communicator-isolating transaction may be implemented as a type of nested transaction that guarantees isolation even for accesses made to transaction communicators and/or transaction condition variables by transactions. In some embodiments, the systems described herein may operate in an object-oriented environment, such as an environment based on the Java™ programming language.

In some embodiments, multiple transactions may execute concurrently, including a waiter transaction and a notifier transaction that may communicate with each other using a transaction condition variable and, in some cases, a transaction communicator object. In some embodiments, the waiter transaction and/or the notifier transaction may be communicator-isolating transactions that are nested within other transactions. The waiter transaction may invoke a wait method of a transaction condition variable, where the transaction condition variable is a condition variable for which transaction isolation has been relaxed. In some embodiments, the wait method may add the waiter transaction to a list of transactions that are waiting for notification from a notify method of the transaction condition variable. After the wait method is invoked, execution of the waiter transaction may be suspended pending notification of a notification event from a notify method of the transaction condition variable.

At some point subsequent to the waiter transaction invoking the wait method, the notifier transaction may invoke the notify method of the transaction condition variable, and the notify method may notify the waiter transaction of a notification event. In some embodiments, the notifier method may also remove the waiter transaction from a list of transactions that are waiting for notification from a notify method of the transaction condition variable, and/or schedule the waiter transaction for resumed execution.

In some embodiments, in response to receiving the notification of the notification event, the waiter transaction may resume execution, and in response to determining that the notifier transaction has successfully committed, the waiter transaction may attempt to commit. In some embodiments, if the waiter transaction fails to commit, the notification of the notification event may be forwarded to another waiter transaction that is waiting for notification from a notify method of the transaction condition variable.

In some embodiments, prior to invoking a wait method, a waiter transaction may evaluate a condition of a transaction communicator object. In such embodiments, the waiter transaction may invoke the wait in response to determining that the condition is not met. In some embodiments, when a waiter transaction resumes execution after receiving notification of a notification event, it may evaluate a condition of a transaction communicator object. In such embodiments, in response to determining that the condition is not met, the waiter transaction may invoke the wait method of the transaction condition variable a second time. In some embodiments, a transaction condition variable may implement "retry-on-wait" semantics. In such embodiments, when a waiter transaction resumes execution after receiving notification of a notification event, it may abort and retry the waiter transaction. In such embodiments, the waiter transaction may evaluate a condition of a transaction communicator object and may invoke the wait method a second time (e.g., if the condition is not met) when the waiter transaction is retried. Note that in some embodiments, the condition being checked by a waiter transaction prior to invoking a wait method or in response to resuming execution after receiving notification of a notification event may involve multiple objects, some of which may not be communicator objects. Note also that, as described in more detail herein, the transaction condition variable may in some embodiments implement "retry-on-wait" semantics within the scope of a communicator-isolating transaction.

In some embodiments, the transaction condition variable may support a waiter indicator method. In such embodiments, the notifier transaction may invoke the waiter indicator method, which may determine whether there are any transactions waiting for notification from a notify method of the transaction condition variable. The notifier transaction may invoke the notify method in response to determining that there is at least one transaction waiting for notification from a notify method of the transaction condition variable.

Figure 1:
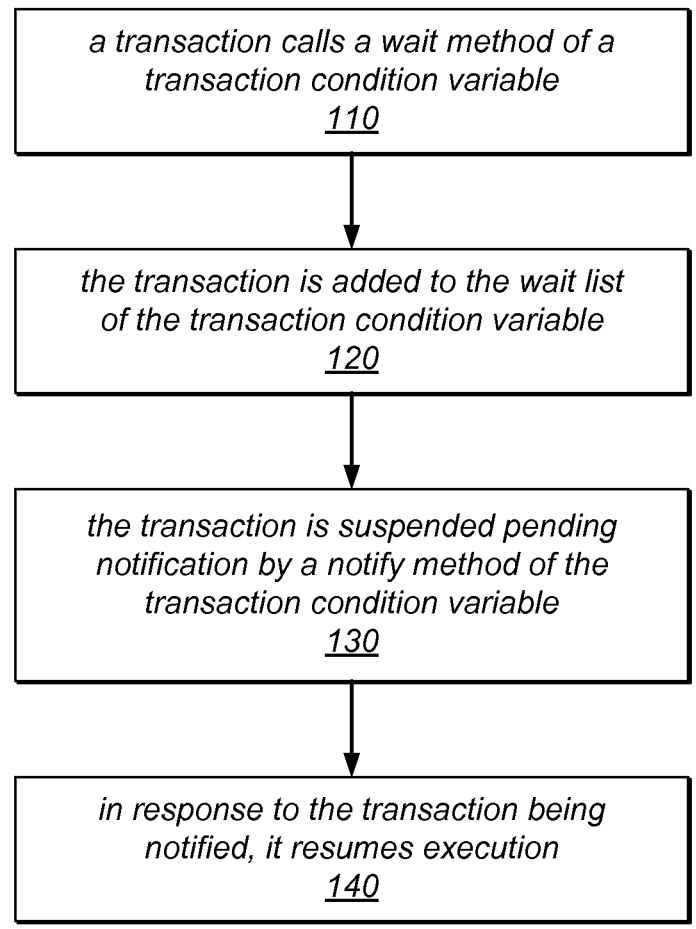
FIG. 1 is a flow diagram illustrating the use of a transaction condition variable and its methods from the perspective of a waiter transaction, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

The systems and methods described herein may allow coordination and communication between concurrent transactions using transaction condition variables. A transaction condition variable (sometimes referred to herein as an xCondition) is a new type of condition variable that, unlike in previous proposals for handling condition variables with transactions, neither forces transactions to abort, nor forces them to commit. Instead, a transaction condition variable creates dependencies between a waiting transaction (also called a "waiter transaction", or simply a "waiter") and a corresponding notifying transaction (also called a "notifier transaction", or simply a "notifier"). The dependencies between these transactions may require that a waiter transaction can commit only if the corresponding notifier transaction commits. In some embodiments, if waiters and notifiers form dependency cycles (for instance, in synchronous communication idioms), they must commit or abort together.

The xCondition construct described herein builds on earlier work on transaction communicator objects (sometimes referred to herein as "communicator objects", or simply as "communicators"), and may be used in conjunction with communicator objects to enable effective coordination and communication between concurrent transactions.

Before describing transaction condition variables in detail, transactions, transactional memory, communicator objects, and communicator-isolating transactions are described to provide context for the remaining discussions. Note that the phrase "concurrent transactions", as used herein, may refer to any collection of transactions that may execute concurrently, including any two or more transactions whose executions at least partially overlap in time. It is not meant to imply that any particular transactions referred to as "concurrent transactions" necessarily begin or end simultaneously, or that their executions necessarily overlap in time completely.

Transactional memory (TM) runtimes may ensure atomic and isolated execution of atomic blocks of code, i.e. those that are marked as transactions. The assumption of these properties (isolation, in particular) may significantly simplify concurrent programming because the TM runtime may ensure that there exists some overall order of execution of transactions. As a result, the programmer may not have to be concerned with (or take into account) any interleavings between individual memory access operations within concurrent transactions. However, isolation may restrict the programming idioms permitted within transactions. Specifically, isolation may prohibit the use of programmer-intended interactions among concurrent transactions. As a result, the use of several common programming idioms such as Communicating Sequential Processes (CSP) style synchronous communication, barrier synchronization, condition synchronization, etc. may be partially or completely precluded within transactions. This may significantly limit the range of applications for which TM can be effectively used. The system and methods described herein may address these issues by providing classes of mechanisms that permit communication and coordination between transactions in a controlled manner.

For example, a system may processes client jobs that should appear to be handled atomically. Processing some of these client jobs may involve accessing a database, and these accesses should themselves appear to be performed atomically. The system may be organized such that the threads handling client jobs are distinct from those with direct access to the database. In this example, a thread handling a client job that requires access to the database may place a request to do so into a queue, and a database thread may handle the request. In such a system, a thread handling the client job cannot execute the client job within a single transaction. Instead, the thread handling the client job must communicate with the database thread that handles its request. In this example, the thread handling the client job cannot simply break the client job into two transactions (such as one to handle the part before the database request and another to handle the part after receiving the result of the database request), because if the transaction for the second part aborts, the effects of the first transaction (and of the database thread that satisfied the request) should be rolled back as well, but the first transaction (and/or the transaction that handles the database request) may have already committed its results.

Existing proposals for providing condition synchronization for transactions do not suffice for this problem because either they require that waiting transactions do not happen at all (as with the retry construct and CCR style transactions), or they break a single isolated transaction into multiple smaller transactions (e.g., via punctuation), thus compromising the isolation of the original bigger transaction. A transaction-based solution requires bi-directional communication between concurrent transactions, and an effective means of coordinating the execution of the transactions, that is, in ordering the various parts of the transactions.

To address the communication aspect, special objects called transaction communicator objects have been proposed, through which concurrent transactions can communicate. However, in the original description of communicator objects, a waiting thread simply spins on a communicator object, which may introduce the usual problems that motivate ordinary condition variables. In addition, this spinning may introduce unnecessary dependencies between waiters and notifiers, especially when many transactions wait on the same condition (as is the case with the database threads in the example above).

A transaction communicator object is a special object that enables desirable communication between concurrent transactions, but limits the impact of the resulting compromise of isolation. For example, updates to a communicator by a transaction may be visible to other transactions accessing the communicator, even before the updating transaction commits, but a transaction that sees the effects of another transaction must not commit unless that other transaction commits, nor may it precede the other transaction in the transaction order. Thus, communicators may induce dependencies among concurrent transactions. In contrast to ordinary transactional memory, mutually dependent transactions induced by cyclic dependencies on communicators may commit, provided that they all commit. In this case, they may all occupy the same position in the transaction order.

Note that in some embodiments, inter-transaction communication may be allowed only through communicators. In such embodiments, a transaction that sees the effects of another transaction on a non-communicator object must be ordered strictly after the other transaction. In addition, no committed transaction may see the effects of an aborted transaction. A set of mutually dependent committed transactions may be thought of as a "super-transaction", where each committed transaction appears in exactly one super-transaction. In some embodiments, these super-transactions may appear to execute one at time, but the operations of transactions within the same super-transaction may appear to be interleaved in any way consistent with the sequential semantics of each transaction.

In some embodiments, communicator objects and transaction condition variables may be explicitly declared, and there may be relatively few of them compared to the total number of shared objects in a parallel program. In some embodiments, class definitions for transaction communicator objects and transaction condition variables may be included in a transaction support library. Communication among active transactions generally violates the isolation property typically associated with transactions, and can result in the types of data races that transactional memory and other synchronization mechanisms are designed to prevent. The systems and methods described herein may reduce or avoid these issues by tracking data flow dependencies (e.g., read-after-write dependencies) and, in some embodiments, by preventing any transaction from committing unless every transaction on which it depends also commits.

Because operations on communicator objects within transactions may be visible to other transactions, transactions may need to synchronize their accesses to communicator objects. In some embodiments, to encourage the transactional style, communicator-isolating transactions (or CITs) may be supported, and these CITs may isolate accesses to communicators (as well as ordinary objects). In such embodiments, all operations within a CIT, including accesses to communicators, may appear to execute together without any interleaving with operations of other threads.

Because CITs isolate communicator accesses and ordinary transactions do not, a CIT nested within an ordinary transaction cannot merely be flattened into its parent. For example, when a nested CIT commits, its effects on communicator objects (but not its effects on non-communicator objects) may be made visible. On the other hand, a CIT within a CIT, or an ordinary transaction within an ordinary transaction, may be flattened because no effects would be made visible to other threads when the nested transaction commits.

Assuming a Java-like language with support for atomic blocks, two language-level constructs have been proposed for communicator objects: the txcomm modifier (which may be used to designate fields as read-write communicator objects), and the txcommatomic block (which may be used to designate blocks of code to executed as CITs). In various embodiments, a communicator object (such as that shown in the example pseudocode below as a TxCommObject) may include fields that contain (i) a reference (data) of type Object, i.e. the data for the field that the TxCommObject represents; (ii) a reference to the last transaction (lastWriter) that wrote to the TxCommObject, which may be used to track dependencies between transactions; and (iii) a reference to the transaction that currently "owns" the TxCommObject, which in some embodiments may act as a lock to guarantee isolation of accesses to TxCommObjects within txcommatomic blocks. For example, the structure of a TxCommObject may in some embodiments be as follows:

```
TxCommObject {
    Object data;
    Transaction lastWriter;
    Transaction currentOwner;
}
```

In various embodiments, the TxCommObject class may provide get and set methods that transactions use to read and write the fields represented by the TxCommObject. In some embodiments, these methods may update both the appropriate fields of the TxCommObject and the dependency list of the invoking transaction, if appropriate. In some embodiments, the write operation in the set method may be a direct update to the data field (in other words, an undo log style write), and the old value of the data field may be logged in a special undo log of the invoking transaction for TxCommObject writes. This undo log may be used by the transaction to roll back updates it made to any TxCommObjects in the event that the transaction aborts. In some embodiments, the transaction commit protocol may ensure that all dependencies between transactions are preserved, i.e. that a transaction cannot commit unless all transactions on its dependency list are guaranteed to commit. In some embodiments, the commit protocol may include the detection of cycles in a dependency graph. In some embodiments, mutually dependent transactions may be guaranteed to commit or abort together, as described above in reference to a super-transaction.

In some embodiments, a communicator-isolating transaction (or CIT) may be supported in the form of a special nested transaction. As noted above, the system may provide flat nesting semantics for communicator-isolating transactions. In such embodiments, a communicator-isolating transaction nested within another communicator-isolating transaction may be equivalent to having just the outer transaction. An ordinary (non-communicator-isolating) transaction nested within a communicator-isolating transaction may also be equivalent to having just the outer (communicator-isolating) transaction, because the outer transaction may isolate accesses to non-communicators as well as communicators. In some embodiments, modifications made to a transaction communicator by an ordinary transaction outside the scope of a communicator-isolating transaction nested therein may be visible to other transactions and to the nested communicator-isolating transaction, while modifications made to non-communicator objects by an ordinary transaction outside the scope of a communicator-isolating transaction nested therein may not be visible to other transactions, but may be visible to the nested communicator-isolating transaction. In other embodiments, all accesses to transaction communicators may be required to be performed within communicator-isolating transactions. The semantics of communicator-isolating transactions may be essentially the same as for ordinary transactions that do not isolate communicators. For example, committed transactions should appear to execute serially in the transaction order, which must totally order all such transactions. Therefore, if two active transactions conflict then (at least) one of them must abort or wait for the other to complete (e.g., either commit or abort). In some embodiments, non-communicator shared objects may be accessed within a communicator-isolating transaction, and may be guaranteed isolation just as in an ordinary transaction.

A more detailed description of transaction communicators, communicator-isolating transactions, and systems that implement these techniques may be found in *Transaction communicators: Enabling cooperation among concurrent transactions*, by V. Luchangco and V. J. Marathe, in Proceedings of the 16th ACM Symposium on Principles and Practice of Parallel Programming, pages 169-178, 2011.

As previously noted, a transaction condition variable (sometimes referred to herein as an xCondition) is a new form of condition variable that does not abort or punctuate a transaction that waits on it. In some embodiments, an active waiting transaction may receive a notification from an active notifying transaction, which compromises the isolation of the waiting transaction (i.e., it "knows" it did not execute in isolation because it receives the notification). However, this compromise may be restricted by enforcing a dependency between the waiter and the notifier such that the waiter can commit only if the notifier commits. In particular, if the notifier aborts, the waiter must also abort. Unlike simple ordering constraints, however, a pair of mutually dependent transactions (e.g., transactions in which each waits, at different times, for something the other produces, as in the example above) may both commit together, in some embodiments. Unlike ordinary transaction communicators, however, a transaction condition variable may maintain a queue of transactions waiting to be notified, and if a transaction so notified aborts, then the signal it received (i.e. the notification it received) may be propagated to another thread on the queue of waiting transaction (if any exist).

In various embodiments, transaction condition variables may be used to protect and communicate data, and may be used in conjunction with transaction communicators. To that end, some embodiments may support an extension to the original communicator object abstraction for better interoperability with transaction condition variables.

The transaction condition variable abstraction may be further illustrated in the context of the Java-like language with support for atomic blocks and communicators described above. For example, in one embodiment, the xCondition may be defined as a class with a public interface, as shown in the pseudocode below.

```
class xCondition {
    public void txwait( );
    public void txnotify( );
    public void txnotifyAll( );
    public boolean hasWaiter( );
}
```

In this example, the txwait, txnotify and txnotifyAll methods may correspond, respectively, to the wait, notify, and notifyAll methods of the Object class in the Java™ programming language. In other embodiments, xConditions may be implemented in a manner similar to that of Java monitors, in which there is no explicit xCondition class and the above methods are added to the Object class. Such considerations are orthogonal to the xCondition functionality. The hasWaiter method illustrated above has no equivalent in the Object class, and will be described in detail later.

In some embodiments, the methods of the xCondition class may only be called from within (i.e. within the dynamic extent of) a CIT (which may be designated as a txcommatomic block). Like an ordinary condition variable, an xCondition may maintain an abstract wait list of transactions that are waiting for a notification on the xCondition. However, an ordinary condition variable cannot be accessed within a transaction because a transaction is supposed to appear to run in isolation. In other words, a thread that waits on an ordinary condition variable within a transaction would never be notified. With xConditions, as with transaction communicators, the isolation of transactions may be relaxed to enable communication between concurrent transactions.

In some embodiments, a transaction calling a wait method (e.g., txwait) on a transaction condition variable (e.g., an xCondition) may be added to the wait list of the transaction condition variable, and then its execution may be suspended until it is notified. When a transaction invokes a notify method (e.g., txnotify) on a transaction condition variable (e.g., an xCondition), the runtime may determines whether there are any transactions on the wait list of the transaction condition variable. If so, the notifier transaction (e.g., via the runtime) may notify such a transaction, removing it from the wait list, and scheduling it for execution (i.e. for resumed execution). In some embodiments, it may also make the waiter dependent on the notifier, so that the waiter cannot commit unless the notifier also commits. If a transaction invokes a method to notify all transactions that are waiting on a given transaction condition variable (e.g., txnotifyAll), then all transactions on the wait list may be notified, removed from the wait list, and scheduled for execution.

Note that in some embodiments, the dependency between a waiter and a notifier may be one-way. In such embodiments, notification does not make the notifier depend on the waiter. Rather, the notifier can commit even if the waiter it notifies aborts. Nonetheless, cyclic dependencies may be introduced if, for example, a notifier subsequently waits on a condition that is satisfied by the transaction it notified, as in the case of the job processing example above. In that example, a client transaction (which may be considered a notifier) may wait for a response from the database thread that processes its request (which may be considered a waiter that was notified by the notifier). As was the case with transactions that employ transaction communicators, transactions in dependency cycles must either all commit or all abort. If they commit, they may occupy the same position in the transaction order, appearing to other transactions as a single "super-transaction". Dependencies introduced by transaction condition variables may be treated exactly the same as dependencies introduced by ordinary communicators, and a cycle may consist of both kinds of dependencies.

Note, however, that enforcing the dependencies between waiters and notifiers may not be sufficient, in some embodiments. For example, if a waiter is notified and is subsequently aborted, the notification should not be lost. In some embodiments, it may be "forwarded" to some other transaction, if any, that was waiting on the same transaction condition variable. Note that this is not the case if the notification occurred due to a notify-all type method (e.g., txnotifyAll), because in that case, all waiting transactions may already have been notified. Such notification forwarding is discussed in more detail later, according to various embodiments.

FIG. 1 illustrates the use of a transaction condition variable and its methods from the perspective of a waiter transaction, according to one embodiment. In this example, the waiter transaction calls a wait method of a transaction condition variable, as in 110. In some embodiments, the wait method may be similar to the txwait method described above. As noted above, each transaction condition variable may be associated with a list of waiter transactions (i.e. a list of transactions that have invoked the wait method of the transaction condition variable and that are currently waiting for a notification from a notify method of the transaction condition variable). In response to calling the wait method, the transaction may be added to the wait list for the transaction condition variable, as in 120. At this point, the waiter transaction may be suspended pending such a notification, as in 130. In various embodiments, a waiter transaction that is suspended may not be scheduled for further execution until it is "woken up" by a notification (e.g., a signal that is passed to the waiter transaction indicating that a notification event has occurred, or that the waiter transaction has been scheduled to resume execution in response to a notification event). In other words, execution of any operations in the waiter transaction that follow the invocation of the wait method in sequential order may be blocked until and unless such notification is received. In response to the waiting transaction being notified of the notification event, it may resume execution, as in 140.

Figure 2:
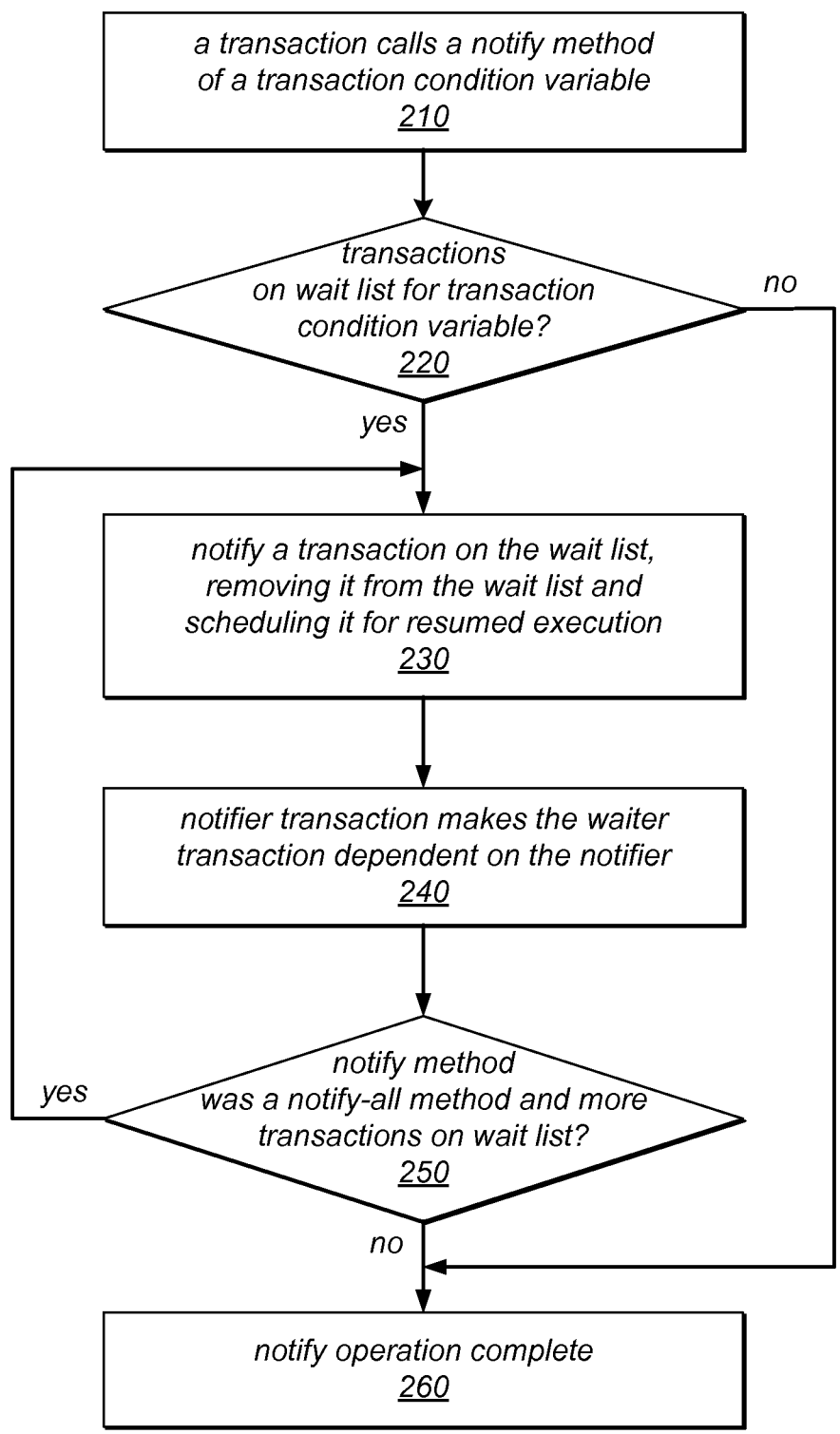
FIG. 2 is a flow diagram illustrating the use of a transaction condition variable and its methods from the perspective of a notifier transaction, according to one embodiment.

FIG. 2 illustrates the use of a transaction condition variable and its methods from the perspective of a notifier transaction, according to one embodiment. In this example, a notifier transaction calls a notify method of a transaction condition variable, as in 210. If there are no waiter transactions on the wait list for the transaction condition variable, shown as the negative exit from 220, the notify operation may be complete, as in 260. However, if the wait list includes one or more waiter transactions, shown as the positive exit from 220, the notifier transaction may notify a transaction on the wait list (i.e. a waiter transaction) of the notification event, as in 230. As illustrated in this example, in some embodiments, the notifier transaction may remove the waiter transaction from the wait list, and schedule it for resumed execution. The notifier transaction may also make the waiter transaction dependent on the notifier transaction, as in 240.

If the notify method was not a notify-all method (shown as the negative exit from 250), the notify operation may be complete at this point, as in 260. If the notify method was a notify-all method and there are additional waiter transactions on the wait list (shown as the positive exit from 250), the operations illustrated as 230 and 240 may be repeated for each of the additional waiter transactions on the wait list (shown as the feedback from 250 to 230). In other words, the notifier may notify each of the additional transactions of the notification event, remove them from the wait list associated with the transaction condition variable, schedule them for resumed execution, and/or make them dependent on the notifier transaction. Once all of the waiters on the wait list have been notified, shown as the negative exit from 250, the notify operation may be complete, as in 260.

Note that while FIG. 2 illustrates an embodiment in which a notifier transaction is responsible for waking up (i.e. notifying) waiter transactions, removing them from the wait list associated with the transaction condition variable, scheduling them for resumed execution, and making them dependent on the notifier transaction, in other embodiments, some or all of these functions may be performed by other threads. For example, in some embodiments, a notifier transaction may generate an indication (or write a value in a specific location) to indicate that it has done something (i.e. something corresponding to a notification event), and one or more background threads may be configured to handle some or all of the mechanics of the notification (e.g., waking up waiter transactions, removing them from the wait list, scheduling them for resumed execution, and/or making them dependent on the notifier transaction). In still other embodiments, multiple threads (which may include one or more notifier transactions, waiter transactions, and/or background threads) may cooperate to perform these notification-related functions, regardless of which transactions/threads generated the work.

Figure 3:
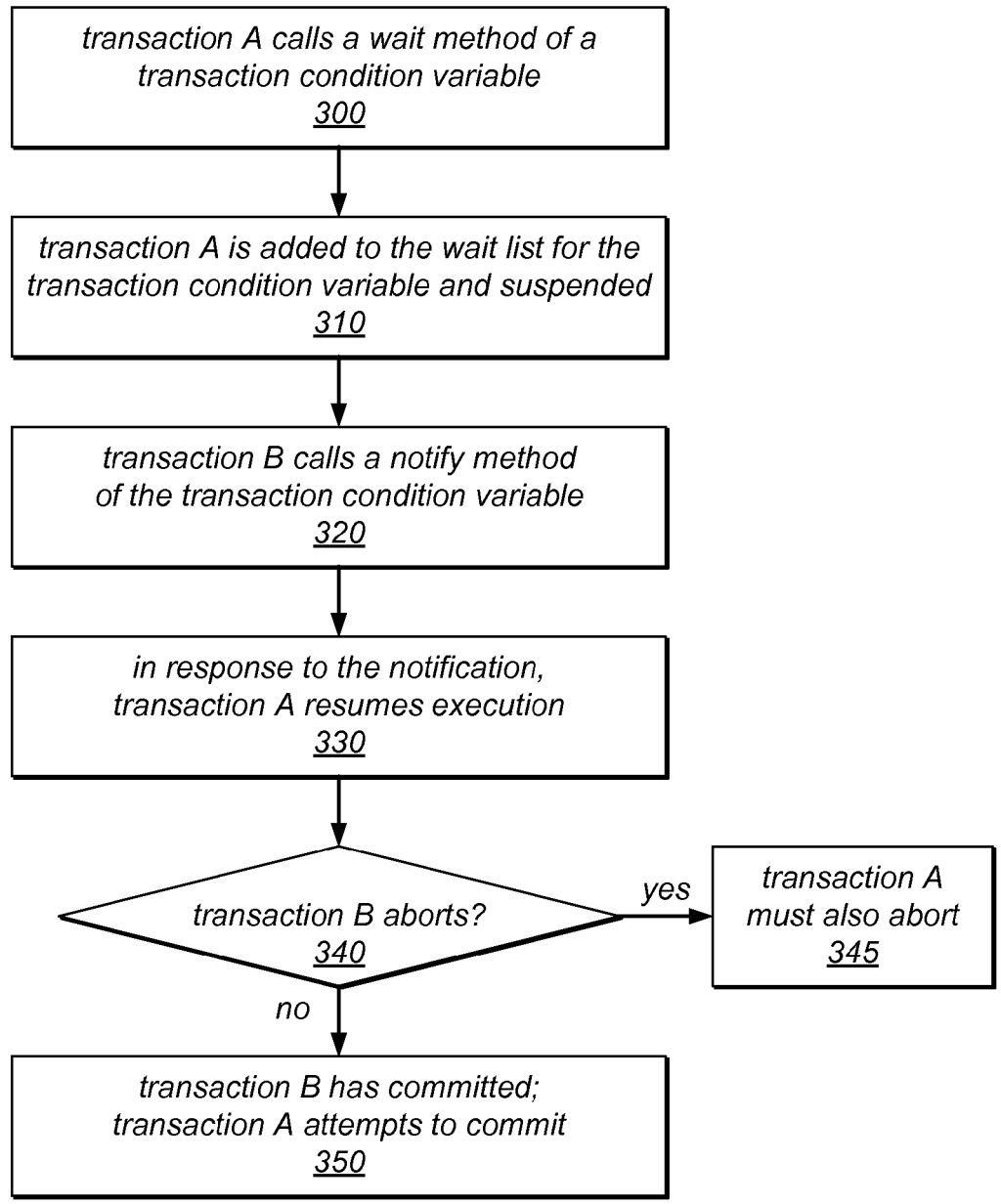
FIG. 3 is a flow diagram illustrating interaction and coordination between a waiter transaction and a notifier transaction using a transaction condition variable, according to one embodiment.

FIG. 3 illustrates the interactions and coordination between a waiter transaction and a notifier transaction using a transaction condition variable, according to one embodiment. As illustrated in this example, a transaction A (which, with respect to a particular transaction condition variable is a waiter transaction) may call a wait method of the transaction condition variable (as in 300). As described above, the waiter transaction may be added to the wait list for the transaction condition variable, and suspended, as in 310. At any point subsequent to transaction A invoking the wait method, a transaction B (which, with respect to the particular transaction condition variable is a notifier transaction) may call a notify method of the transaction condition variable, as in 320. Note that this notify method may be a notify-all method (in which case it may notify all waiter transactions on the wait list associated with the transaction condition variable of the notification event) or may be a notify method that signals a single transaction of the notification (e.g., the first one of the waiter transactions on the wait list).

In response to receiving the notification, transaction A may resume execution, as in 330. For example, the notification may include a signal indicating that the notification event has taken place and/or that the waiter transaction has been scheduled for resumed execution, in different embodiments. At this point, the waiter transaction has been made dependent on the notifier transaction, as described above. Therefore, if transaction B subsequently aborts (i.e. fails to commit), shown as the positive exit from 340, transaction A must also abort, as in 345. If transaction B successfully commits, shown as the negative exit from 340, transaction A may (when it has completed its work) attempt to commit, as in 350. Note that in this example, transaction B may attempt to commit at any point subsequent to having invoked the notify method, as it is not dependent on transaction A or on any other waiter transactions. Note also that transaction A may or may not successfully commit. However, in this example, an abort of transaction A will not prevent transaction B from committing, since transaction B (the notifier transaction, in this example) is not dependent on transaction A (the waiter transaction, in this example).

Figure 4:
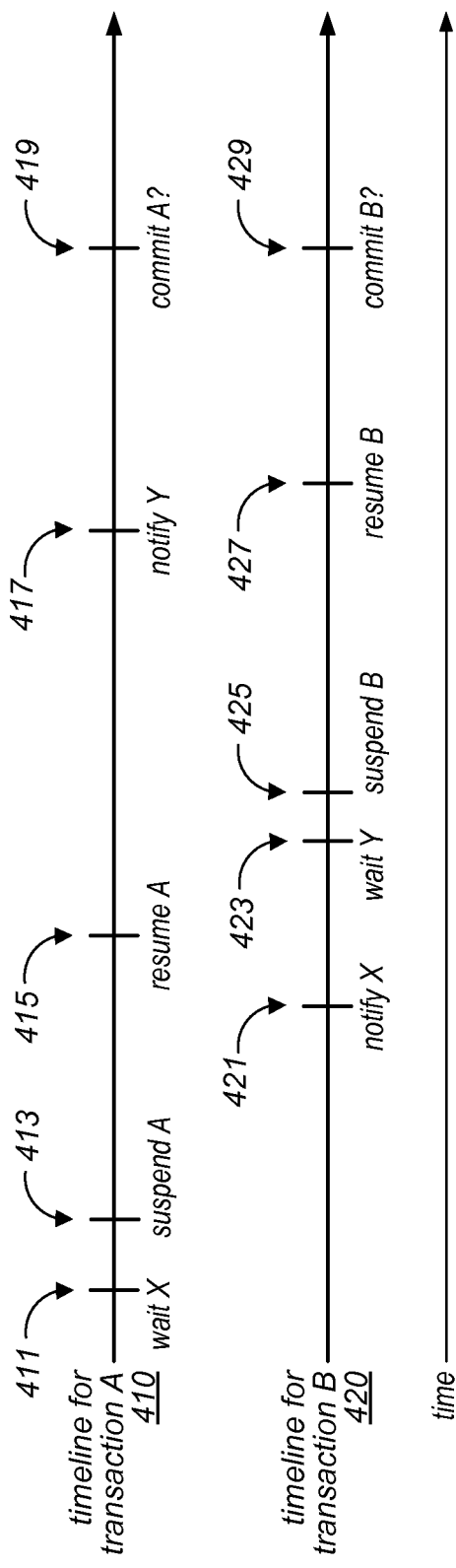
FIG. 4 illustrates the execution of two transactions that have a cyclic dependency, according to one embodiment.

As previously noted, cyclic dependencies may be introduced if, for example, a notifier subsequently waits on a condition of a communicator object or transaction condition variable that is satisfied by the transaction it previously notified. FIG. 4 illustrates the execution of two transactions that have such a cyclic dependency, according to one embodiment. In this example, transactions A and B execute concurrently, and the timelines illustrated in FIG. 4 are assumed to be concurrent in time (i.e. they begin and end at the same time and use the same time scale). In this example, both transaction A and transaction B have access to a transaction condition variable X and a transaction condition variable Y. In this example, transaction A (for which events and/or operation are shown along timeline 410) invokes a wait method of transaction condition variable X (at time 411) and is suspended shortly thereafter (at time 413). At some point subsequent to transaction A invoking the wait method of transaction condition variable X (e.g., at time 421), transaction B invokes a notify method of transaction condition variable X, notifying transaction A of this notification event. In response to the notification, execution of transaction A is resumed (at time 415), and transaction A becomes dependent on transaction B (as its notifier for transaction condition variable X).

In this example, at some point after transaction B invokes the notify method of transaction condition variable X, transaction B invokes a wait method of transaction condition variable Y (shown as time 423). Shortly thereafter, transaction B is suspended (at time 425). Subsequently (at time 417), transaction A, which has resumed execution, invokes a notify method of transaction condition variable Y. In response to this notification, transaction B resumes execution (at time 427) and becomes dependent on transaction A (as its notifier for transaction condition variable Y). As illustrated in this example, transactions A and B, being mutually dependent, may attempt to commit (at time 419), and must both successfully commit or both abort. In other words, if either of these transactions fails to commit, the other must abort. If transaction A and transaction B both successfully commit, the effects of both transactions may appear to take place at the same time (illustrated in FIG. 4 as times 419 and 429, respectively).

Note that the operations and events illustrated in FIG. 4 are placed on timelines 410 and 420 merely for the purposes of illustrating the relative times at which these operations and event would take place, in this example. The distances between operations and event on these timelines are not meant to imply any particular amount of time that may pass between consecutive operations or events (e.g., between a call to a wait method and a corresponding transaction suspension, between a call to a notify method and a corresponding transaction resumption, etc.). Note also that in some embodiments, cyclic dependencies may be induced when two concurrent transactions invoke the wait and notify methods of the same transaction condition variable, when two concurrent transactions modify (and/or check for a particular value of) a communicator object, and/or in other synchronous communication idioms. For example, in the job processing example described herein, a client transaction may wait for a response from a database thread that processes its request. The use of communicator objects in conjunction with transaction condition variables is described in more detail below, according to various embodiments.

Note that although transaction condition variables share many characteristics with transaction communicators, there are also some significant differences, making it impossible to implement transaction condition variables directly using communicators. For example, implementing the wait list of a transaction condition variable using ordinary communicators would introduce many more dependencies than the simple one-way dependence of a waiter on the transaction that notified it. Such an implementation would almost always result in many transactions being (unnecessarily) mutually dependent because of reading and writing communicators used to implement the wait list. More fundamentally, whereas a communicator encapsulates shared data, which transactions can read or write in order to communicate with each other, a condition variable captures a communication event, that is, the notification event. In some embodiments, when a transaction aborts, any notification it received must be restored and forwarded to another waiter (if any) that could have received it instead. There is no equivalent read, write, or dependency forwarding mechanism in transaction communicators.

In various embodiments, the wait method of a transaction condition variable may be blocking. In other words, the wait method may not return until some other transaction calls a corresponding notify method of the transaction condition variable. Thus, although the wait method may be necessarily invoked before the notification it receives, it may be dependent on, and semantically ordered after that notification. Therefore, the wait method cannot be conceived as a single atomic operation. In contrast, operations on communicators always return, even if only to indicate that there is no valid value to be read, and can be thought as atomic operations on encapsulated data. This makes the semantics of communicators easier to describe, but does not allow the flexibility of the wait method of a transaction condition variable, which may avoid introducing the unnecessary dependencies described above. Note that because the wait method itself is blocking, the naive semantics described above may not make sense within a communicator-isolating transaction (i.e. within a txcommatomic block). For example, a thread that appears to run in isolation cannot receive a notification from another thread. This issue is discussed in more detail later.

In some embodiments, when a thread is notified after waiting on a transaction condition variable, it may read some data to determine whether the condition it was waiting for has indeed been satisfied. Because transaction condition variable, like condition variables in general, may not encapsulate data, this data must be in other objects. And because transactions cannot see the effects of other threads on ordinary objects, such data flow must occur through transaction communicators. For example, consider a simple condition synchronization idiom in which X is a transaction condition variable, and one thread executes a waiter transaction, as in the following pseudocode:

```
atomic {
    ...
    while (!canProceed) {
        X.txwait( );
    }
    // access data protected by X
    ...
}
```

In this example, another thread executes a corresponding notifier transaction, as in the following pseudocode:

```
atomic {
    ...
    // initialize data protected by X
    canProceed = true;
    X.txnotify( );
    ...
}
```

In this example, the notifier wakes up the waiter after modifying the shared state that the waiter accessed before waiting (i.e., the "canProceed" object), and will access after waking up (i.e. data protected by X). In this example, unless "canProceed" is a communicator object, this may lead to a conflict that must result in at least the waiter transaction aborting.

In some embodiments, the code above may suffer from lost notifications, a well known problem with condition synchronization. For example, the notifier's update of canProceed and notification on X may occur between the waiter's access of canProceed and its subsequent txwait call. In embodiments that employ ordinary condition variables, losing notifications may be avoided by protecting the data with a lock that is held by the thread before calling wait. This lock may be released only after the thread is added to the wait list, and it may be acquired again when the thread is notified. However, to avoid locking, transaction condition variables and communicator-isolating transactions may be used instead.

In some embodiments, in order to avoid lost notifications in the example above, the transaction condition operations may be synchronized with the checking and establishing of the desired condition. To retain a transactional style of programming, this synchronization may be accomplished using a communicator-isolating transaction (CIT) rather than a lock. In such embodiments, for the example above, the waiter may be implemented as illustrated by the pseudocode below:

```
atomic {
    ...
    txcommatomic {
        if (!canProceed) {
            X.txwait( );
        }
        // access data protected by X
    }
    ...
}
```

In this example, a corresponding notifier may be implemented as illustrated by the pseudocode below:

```
atomic {
    ...
    txcommatomic {
        // initialize data protected by X
        canProceed = true;
        X.txnotify( );
    }
    ...
}
```

However, as noted above, a naive interpretation of the wait method (i.e. txwait) may not make sense within a CIT. Therefore, the semantics of the wait method may be defined for this case such that the manner in which condition variables (and, more specifically, transaction condition variables) are used is taken into consideration. In particular, ordinary condition variables are typically used only in patterns like the one described above to avoid the lost notification problem (and this may sometimes be enforced by the language). In some embodiments, the semantics of the wait method may support this pattern. For example, transaction condition variable operations may only be supported within the dynamic extent of a communicator-isolating transaction.

In some embodiments, and in keeping with the spirit of condition synchronization, the implementation of transaction condition variables may allow a waiting thread to be de-scheduled until it is notified. In some embodiments, the implementation may retain the appearance of isolation for the communicator-isolating transactions within which transaction condition variables are accessed. In addition, the implementation may avoid establishing unnecessary dependencies among the transactions that access a transaction condition variable, and may ensure that notifications are not lost. In some embodiments, these goals may be achieved by adopting "retry-on-wait" semantics, with a twist. For example, in such embodiments, when a thread invokes wait method within a CIT, it may behave as though it invoked a retry instead, i.e. aborting and re-executing the nested transaction (i.e., the CIT). However, rather than retrying the transaction when any data that it read changes, it may retry upon being notified. In such embodiments, if the desired condition is satisfied, the waiting thread may not invoke the wait method when it re-executes the nested transaction. In a sense, the effect may be as if the call to the wait method occurs at the beginning of the CIT. In other words, the notification may be the first event of the waiting transaction's CIT, and all of the subsequent accesses may appear to take place atomically upon receiving it, without the interleaving of operations of any other thread.

In some embodiments, if, upon re-executing the nested transaction, the thread again invokes the wait method (on the same transaction condition variable, or in some case on a different transaction condition variable), then the nested transaction may again be aborted, and the thread may again wait to be notified. Because the nested transaction has been aborted, the notification it received may be forwarded to some other waiter transaction for the transaction condition variable on which the waiter was waiting (if any exists).

In some embodiments, when a thread commits a nested CIT after having waited on a transaction condition variable, its enclosing transaction may depend on the transaction whose notification it received, as well as any transaction whose effects it has observed (e.g., any transaction that wrote to a communicator that it read) within the CIT. However, the enclosing transaction may not be dependent on transactions whose effects it observed in previous aborted attempts to execute the CIT, including those whose notifications it received but forwarded because the subsequent CIT aborted.

In some embodiments, if a wait method is invoked inside a CIT that also checks that the item satisfies the desired property, the wait method may cause the nested CIT (i.e., the execution of the CIT) to abort, and the thread to wait until it is signaled (i.e. notified). In this example, when the CIT aborts, the dependencies that were recorded for accessing objects within the CIT may be discarded. This is because by aborting, it is as if the CIT was never executed, except that the thread now waits to re-execute the CIT when the thread is signaled (i.e. notified). In this case, the waiting transaction may not depend on the notifier whose signal it ultimately ignored.

Note that in some embodiments, because a given notifier may not change the program state to enable any of the existing waiters to make forward progress, all of the waiters may end up waiting after they received a (possibly forwarded) notification. In some embodiments, the runtime system may be able to ignore (or drop) such notifications. This may facilitate an improvement to the usual pattern for condition synchronization by eliminating the explicit loop (as the above example). In such embodiments, a waiter may consume at most one notification for each committed CIT, whereas with ordinary condition synchronization, a waiter may consume multiple notifications before it finds its desired condition satisfied. For example, the notifier might not make the condition true, or some other thread might intervene and falsify the condition.

Note that because a transaction (including a nested CIT) may always be aborted, in some embodiments, notifications may never be received. In such embodiments, the nested CIT may simply be aborted upon invocation of the wait method, and may just happen to be re-executed at some time when it can commit without invoking the wait method. In this example, the wait method may be roughly equivalent to a retry construct. An implementation that behaves in this manner may be correct, according to the semantics described herein, the difference being whether or not the notification is "consumed" and a dependency is established. Even the latter is unlikely to be an actual difference between the methods because the waiter will likely read some data written by the notifier, and so be dependent on it in any case.

Figure 5:
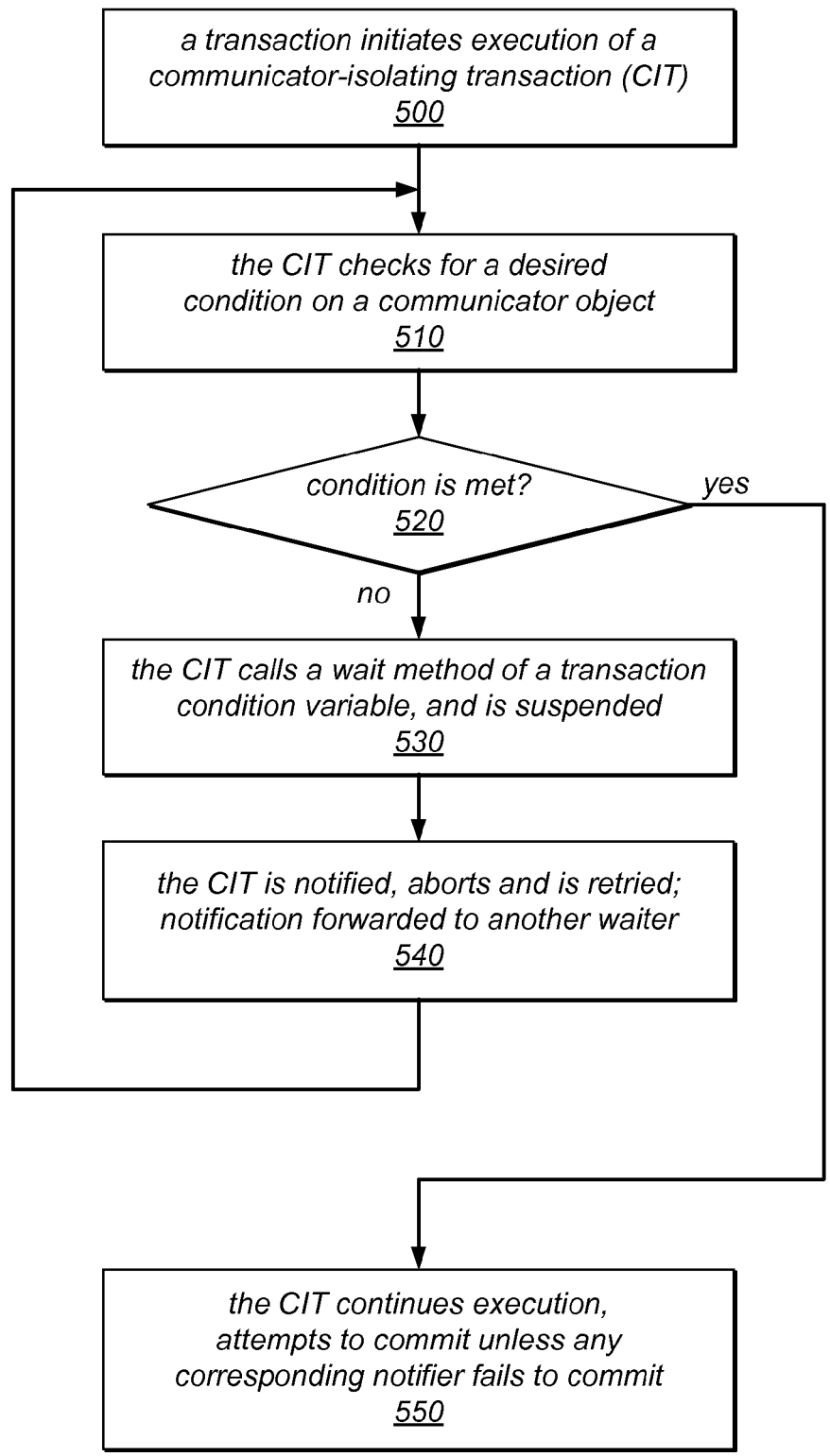
FIG. 5 is a flow diagram illustrating a method for applying a "retry-on-wait" technique to a communicator-isolating transaction, according to one embodiment.

One method for applying "retry-on-wait" techniques to communicator-isolating transactions is illustrated in FIG. 5, according to one embodiment. In this example, a transaction initiates execution of a communicator-isolating transaction (CIT) nested within the transaction, as in 500. The CIT checks for a desired condition on a communicator object, as in 510. For example, the CIT may read a value of the communicator object to determine whether it is an expected or desired value. If the condition is met, shown as the positive exit from 520, the CIT continues execution, and attempts to commit, as in 550. In this case, since the CIT did not invoke a wait method of a transaction condition variable, it is not dependent on any notifier transactions. Note that in some embodiments, the condition being checked by a CIT may involve multiple objects, some of which may not be communicator objects.

In the example illustrated in FIG. 5, if the desired condition on the communicator object is not met, shown as the negative exit from 520, the CIT may call a wait method of a transaction condition variable, and may be suspended pending a corresponding notification, as in 530. In response to the CIT being appropriately notified, it may be aborted and retried, as in 540. In some embodiments, the notification may be forwarded to another waiter transaction, as described herein. Aborting the CIT may in some embodiments release the CIT from its dependence on the transaction that provided the notification. Upon being retried, the CIT may repeat the operations illustrated as 510-520, and, if the desired condition is still not met, the operations illustrated as 530-540. In some embodiments, the operations illustrated as 510-540 may be repeated multiple times, e.g., until the desired condition is met, or until a retry limit or timeout condition has been reached. If, upon a retry, it is determined that the desired condition has been met, shown as the positive exit from 520, the CIT may continue its execution, as in 550. In this case, this enclosing transaction may be dependent on the eventual notifier transaction (i.e. the most recent notifier, in the case that multiple notifications are received before the desired condition is met). Therefore, the CIT may attempt to commit only if this eventual notifier transaction also commits.

Note that in some embodiments, once the CIT commits, it may return an indication of success to the enclosing transaction (i.e. the transaction that initiated execution of the CIT), which may continue past the point at which execution of the CIT was initiated. Note that this enclosing transaction may be dependent on the CIT and its eventual notifier transaction, but may not be dependent on any other notifier transactions whose notifications were forwarded because the CIT was aborted. Note also that in other embodiments, rather than the CIT being suspended when invoking a wait method (as step 530) and aborted following notification (as in 540), the CIT that invokes the wait method may be aborted following the invocation of the wait method (e.g., in an alternate stop 530), and then it may be retried (in an alternate step 540).

The use of transaction condition variables (i.e. xConditions), in conjunction with communicator objects, may be further illustrated using two different applications: the client-server application described above, and a scenario in which error conditions encountered in a transaction need to be "forwarded" to an error logger thread (e.g., an error logging transaction). Both examples demonstrate the effectiveness of expressing idioms that were difficult or impossible to express with previous condition synchronization constructs.

Producer-consumer queues are used widely in concurrent applications. Producer-consumer queues may be implemented using read-write communicator objects for communication between producers and consumers. However, in such implementations, a consumer waiting for an item to be produced may simply "spin" until the queue is nonempty, and then the consumer could claim the item. A transactional producer-consumer queue can also be implemented with the retry construct. However, that would preclude communication idioms such as the one described above (and illustrated in FIG. 6).

A producer-consumer queue, such as that described above, may be built using transaction condition variables, as in the example pseudo code below. In this example, a producer-consumer queue may be implemented as a linked list of queue nodes, each of which includes a "data" field, and a "next" field. The head node of the queue (which may be indicated using a "head" pointer or field in the queue), the tail node of the queue (which may be indicated using a "tail" pointer or field in the queue), and the queue node fields "data" and "next" may be designated as communicator objects because all of the producer and consumer transactions may read and/or write these fields. Both the producers and consumers may access these fields from within communicator-isolating transactions (shown in the pseudocode below as txcommatomic blocks).

The pseudocode below illustrates an example of a producer-consumer queue that is built using transaction condition variables, according to one embodiment. In this example, the head and tail nodes of the queue are designated as read-write communicator objects by use of the "txcomm" modifier.

```
class ProducerConsumerQueue {
    txcomm Node head = null;
    txcomm Node tail = null;
    xCondition xc = new xCondition( );
    public void produce(Object data) {
        Node myNode = new Node(data);
        txcommatomic {
            if (tail = = null) {
                head = tail = myNode;
            } else {
                tail.next = myNode;
                tail = myNode;
            }
            xc.txnotify( );
        }
    }
    public Object consume( ) {
        Node node;
        txcommatomic {
            if (head != null) {
                // queue is not empty, do the dequeue
                node = head;
                if (head.next = = null) {
                    // dequeuing last node
                    head = tail = null
                } else {
                    head = head.next;
                }
                return node.data;
            } else {
                xc.txwait( );
            }
        }
    }
}
class Node {
    txcomm Object data;
    txcomm Node next;
    public Node(Object data) {
        this.data = data;
    }
}
```

A producer-consumer queue is a widely used data structure that permits buffered communication between concurrent threads. In some embodiments, the producer-consumer data structure presented above may be built upon to provide a solution to the example job processing application described earlier. Recall that the application consists of a client transaction that collaborates with a concurrent database transaction to process a request atomically. In this example, a client transaction creates a request and posts it in a producer-consumer queue. A database transaction gets a client's request from the producer-consumer queue, processes it, and posts a response for the client transaction's consumption. The client transaction gets the response and may process it further. In this example, all of this computation must happen atomically (i.e. the entire job of processing a request, including the communication back and forth between the client transaction and the database transaction must be executed in a single transaction). In other words, in this example, a job requiring access to the database involves two mutually dependent transactions. If either transaction aborts, the other must also abort, and both transactions must roll back any modifications made to communicators and non-communicator objects in the event of an abort.

Figure 6:
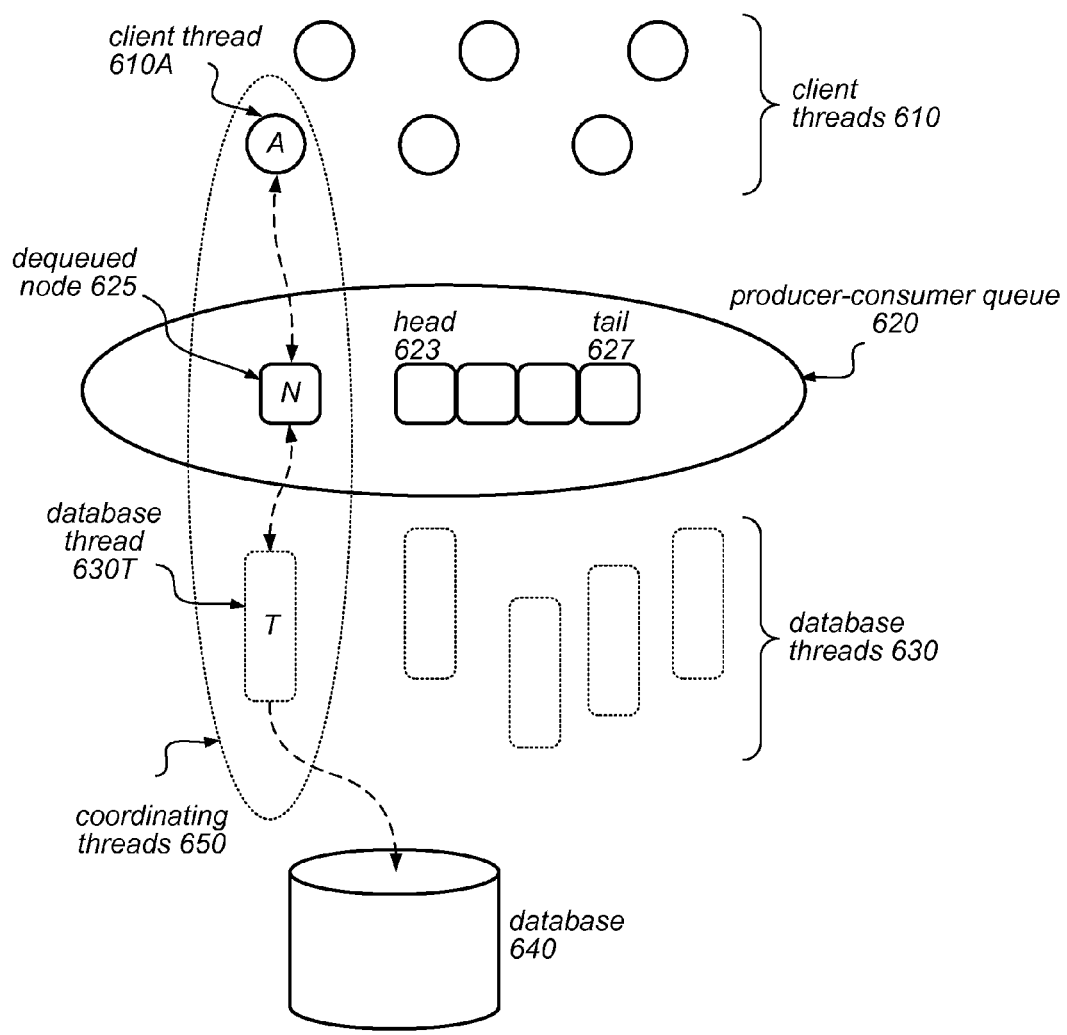
FIG. 6 illustrates a producer-consumer queue, according to one embodiment.

One such producer-consumer queue is illustrated in FIG. 6, according to one embodiment. In this example, a producer-consumer queue 620 is implemented as a linked list of queue nodes, each of which includes a "data" field, and a "next" field. In this example, the head node of the queue (e.g., which may be indicated using a "head" pointer or field in the queue) is node 623, and the tail node of the queue (e.g., which may be indicated using a "tail" pointer or field in the queue) is node 627. In this example, the queue fields "head" and "tail", and the queue node fields "data" and "next" may be designated as communicator objects because all of the producer and consumer transactions may read and/or write these fields. Both the producers and consumers may access these fields from within communicator-isolating transactions (shown in the pseudocode below as txcommatomic blocks).

In this example, client threads 610 and database threads 630 may concurrently access producer-consumer queue 620. In this example, a producer may use a single CIT (designated as a txcommatomic block) to enqueue a new node in the queue (e.g., by adding a node to the tail). In this example, a consumer may use a single CIT (designated as a txcommatomic block) to dequeue a node from the queue (if the queue is not empty), e.g., by taking it from the node pointed to by the head. As illustrated in FIG. 6, a client thread 610A may place a request to access database 640 into producer-consumer queue 620 (i.e. client thread 610A may enqueue, or produce, a request). A database thread 630T may dequeue (or consume) the entry (shown as dequeued node 625) and may access database 640 on behalf of client thread 610A to process the request. In other words, client thread 610A and database thread 630T may represent threads or processes that have a dependency relationship. Therefore, they are designated in FIG. 6 as coordinating threads 650.

In this example, which relies on transaction condition variables, a consumer (i.e. a database thread 630) may call a wait method of a transaction condition variable when it finds the queue to be empty. As per the retry-on-wait semantics described herein, calling the wait method may essentially abort the consumer's CIT (which is designated as a txcommatomic block), and may force it to wait for a notification. In this example, a producer (i.e. a client thread 610) may always invoke a notify method when it adds a new node to the producer-consumer queue 620. The underlying condition variable implementation may determine which (if any) database thread 630 will receive the notification (i.e. if one or more of the database threads 630 are waiter transactions).

The pseudocode below illustrates an example producer-consumer queue that uses transaction condition variables (i.e. xConditions) and communicator objects to enable interaction between the client and database transactions. In this example, the client posts its request in a shared producer-consumer queue, and uses a CIT (designated as a txcommatomic block), along with a transaction condition variable, to wait for a response from the database transaction. In this example, the database transaction gets a request from the producer-consumer queue, or waits for one, using the queue's transaction condition variable, if none is available. The database transaction then processes the request, and posts a response. In this example, the response includes sending a notification on the request's transaction condition variable. Note that in this example, the mutual dependencies generated between the two transactions forces them to commit or abort together as a super-transaction.

```
// a producer-consumer queue used by the client and database
// transactions to communicate with each other
ProducerConsumerQueue pc;
// client side transaction
//
atomic {
    // some computation
    ...
    // post a request; the request includes a txcomm field called
    "response"
    // and a transaction condition variable called "condvar"
```

```
    pc.produce(myRequest);
    txcommatomic {
        // myRequest.response is a txcomm field
        if (myRequest.response = = null) {
            // wait for the response to show up
            myRequest.condvar.txwait( );
        }
    }
    // more computation based on the response
    ...
}
// database side transaction
//
atomic {
    // wait for a client request
    clntRequest = pc.consume( );
    // process the request
    localResponse = process(clntRequest);
    txcommatomic {
        clntRequest.response = localResponse;
        clntRequest.condvar.txnotify( );
    }
}
```

Error logging can be a very useful tool for postmortem analysis of program execution, where "error" does not refer to a program error that must be avoided at run time, but legitimate program states that need to be recorded by the application in a special way. For example, it may be useful to log compilation errors generated when a compiler compiles a program, or bank account overdrafts in a banking transaction (which might require rolling back of some program state in case overdrafts are prohibited for the bank account). Programs that support error logging are sometimes configured in such a way that errors are logged by specialized logger threads, and these threads may need to be informed about error conditions by threads that perform the real work of the program. The pseudocode below illustrates an example transaction that does some work, and then reaches an error condition. In this example, in response to reaching the error condition, the transaction reports the error to a logger thread, waits for the logger thread to finish its logging, and then may need to "undo" some (but not all) of the changes it made that may have lead to the error. Note that simply aborting the transaction may not be desirable in this case because some of its effects may need to be preserved in spite of the error condition. Furthermore, the "partial undo" of the transaction may be required to happen in the same transaction in order to preserve program invariants.

Both of the example applications described above may be impossible to code using a retry construct, because the retry construct has the effect of the retrying transaction not executing at all (hence no request is generated by the client or worker transaction in the first place). Furthermore, the punctuated transactions approach is problematic because this would commit the part of the enclosing transaction completed so far. This would break the transaction into "transaction fragments", the collection of which are no longer guaranteed to execute as a single atomic unit (as was originally intended by the programmer). This may break program invariants in arbitrary ways, and re-enforcing them may be a nontrivial endeavor. As described herein, transaction condition variables and communicator objects may facilitate a convenient solution to both problems.

The error condition reporting example illustrated in the pseudocode below includes one transaction that performs real work, and that reaches an error condition that needs to be logged for postmortem analysis. In this example, a sendError method uses a CIT and communicator objects (embedded in errorDescription) to send the error description to the logger transaction. The communication from the worker transaction to the logger transaction may happen either using a producer-consumer queue, as in the previous example, or using a dedicated channel between the worker transaction and the logger transaction, in different embodiments. In this example the waitForResponse method uses a CIT to wait on a transaction condition variable that is used by the logger transaction to notify the waiter once it completes the logging. Note that many of the details of these transactions are omitted for simplicity.

```
// transaction performing real work
atomic {
    // do some work
    if (error) {
        sendError(errorDescription);
        waitForResponse( );
        // undo some work
    }
}
// transaction doing the error logging
atomic {
    errorDescription = waitForLoggingRequest( );
    logErrorInLocalBuffer(errorDescription);
    notifyRequester( );
}
```

In some embodiments, support for transaction communicators and/or transaction condition variables, as described herein, may be integrated into an STM for managed-code environments. In some such embodiments, the STM may perform object level locking and conflict detection, and/or field level logging. In such embodiments, reads may be invisible, writes may happen in place, and transactions may maintain read, write and undo sets. In some embodiments, the STM may be implemented as a library, and not integrated with the compiler. In such embodiments, users may need to manually add instrumentation for transactional operations. For simplicity, some embodiments may only support flat nesting of transactions, except for communicator-isolating transactions nested within ordinary transactions.

In some embodiments, communicator objects may be implemented as wrapper classes around primitive types. In such embodiments, the programmer may use communicator objects as individual fields in Java classes. CITs may be implemented as closed nested transactions inside ordinary transactions. In addition to the typical locking, logging, and validation operations performed on ordinary memory accesses, CITs may also perform similar operations on communicator objects, via special getter and setter methods. Although implemented in a closed nested fashion, when they commit, CITs may release ownership of all the communicator objects that they accessed. This may enable them to expose their effects on communicator objects even when the enclosing transaction is still active. The enclosing transaction, however, may inherit the read and write "communicator sets" of a committed CIT in order to be able to perform validation and roll back in the case that the enclosing transaction aborts. As CITs access communicator objects they may build the dependency list of active transactions whose effects on communicator objects were observed. This dependency list may be transitively used by the outermost transaction in its commit protocol to ensure that transactions respect all the dependencies, including the cyclic ones.

In some embodiments, the transaction condition variable (shown in various pseudocode examples herein as the xCondition) may be implemented as a Java class having the aforementioned methods. In some embodiments, the existing Java monitors API may be leveraged in the implementation of the txwait, txnotify, and txnotifyAll methods described herein. In some embodiments, a call to the txwait method may abort the enclosing CIT and may force the caller thread to wait on the target xCondition by calling Object.wait. Recall that in general, xConditions can be accessed only within CITs. As noted above, before waiting, the waiter may add itself to a wait list inside the xCondition. The notifier may use this wait list to select a waiter to notify. For example, the notifier may select the waiter that has been waiting the longest, in some embodiments, or the waiter at the head or tail position in the list. In some embodiments, before sending the notification, the notifier may add itself to the waiter's dependency list. This may be the same dependency list that is used to enforce dependencies between communicator accessing transactions. In this case, no more additions may be required in the implementation to enforce the waiter-notifier dependencies. If the waiter happens to call the txwait method again, the last notification it received may be forwarded to another concurrent waiter, in some embodiments. In this case, the corresponding dependency may also be discarded. Note that as described above, the txnotifyAll method may simply apply the txnotify method on all of the waiters for a target xCondition.

Note that in some embodiments, while a waiter transaction is still waiting, if the waiter transaction becomes doomed to abort because a concurrent transaction conflicts with the waiter, it may be woken up by the transaction (e.g., using a Java monitor notification). In such embodiments, upon waking up, the waiter may revalidate itself to determine whether it must abort. If so, it may abort. If not, it may go back to waiting on the same xCondition on which it was originally waiting. In some such embodiments, the waiter may be able to distinguish between a notification received by a notifier and a notification received by a conflicting writer. This distinction may be made by using a flag (e.g., a waitFlag), in the descriptor for the waiter transaction. For example, this flag may be set by the waiter just before it begins waiting on an xCondition, and may be reset by the notifier transaction during the notification. Thus, the waiter, when it is woken up, may simply check its waitFlag in order to determine whether it was notified (and awakened) by a notifier.

As previously noted, in the event of aborting waiters, the system may in some embodiments be configured to forward notifications (and establish corresponding dependencies) correctly. In such embodiments, a version number (stored as a value of a numeric "version" indicator) may be included in each xCondition, and its value may be incremented during a txwait call. In some embodiments, each waiter may log an indication (or identifier) of all the xConditions it has waited on in its own xCondition-list, along with their corresponding versions (e.g., the value of the version number at the time of the txwait call). In some embodiments, each node in the xCondition-list may include another version called the notifyVersion, which may indicate the value of the version identifier of the corresponding xCondition at the time the waiter received its notification. In such embodiments, a snapshot may be taken of the "notification time" (expressed in terms of the value of the version number), and this may be used in the notification forwarding process to determine if there exists a waiter that was waiting when the notification was originally delivered to an aborted waiter. If there were such waiters, the notification may be forwarded to one of them. If there were no such waiters, the notification may be (correctly) dropped. Notification forwarding may include making the new waiter dependent on the original notifier, and explicitly notifying the new waiter (e.g., via Java's notify call).

Figure 7:
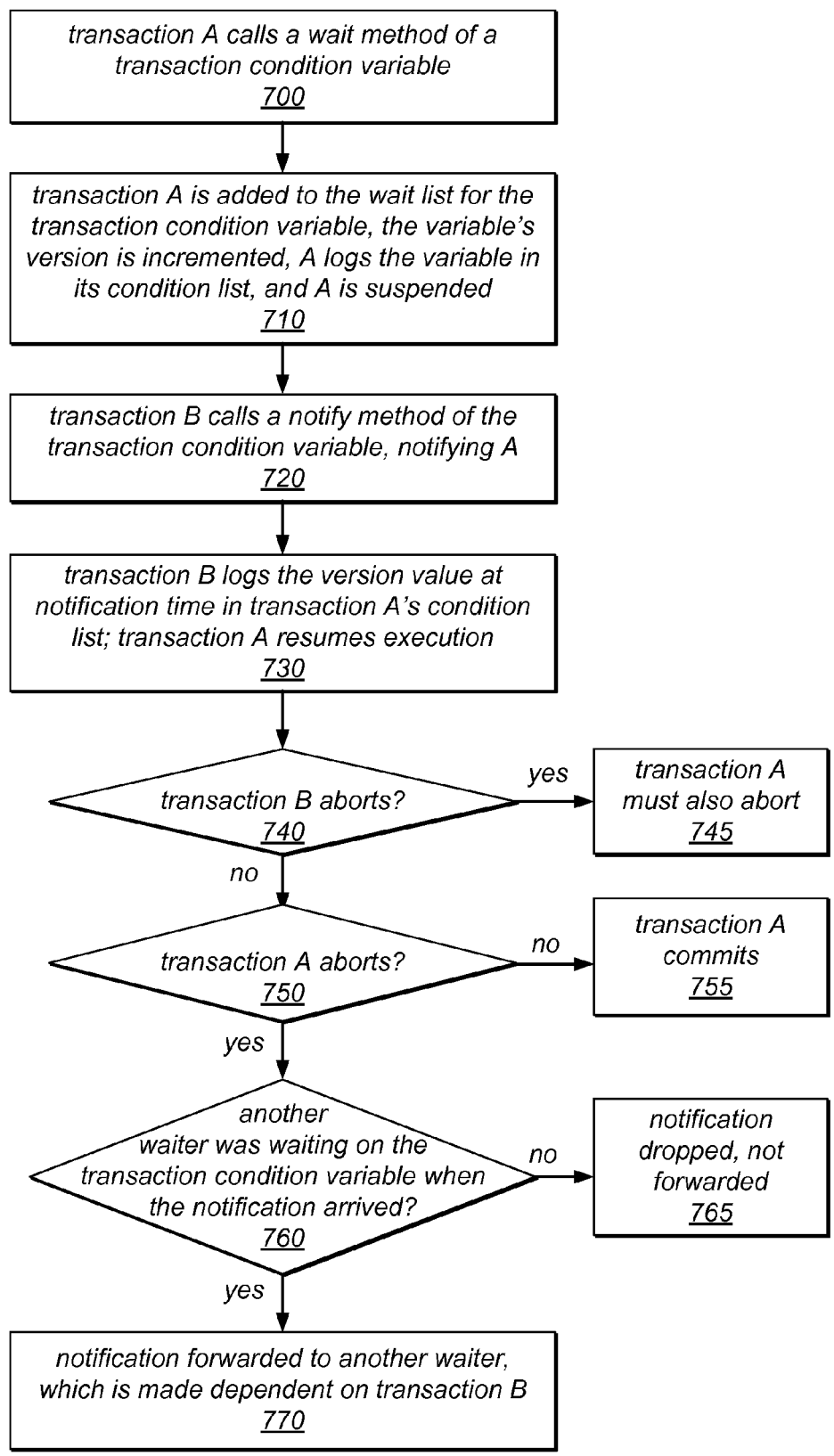
FIG. 7 is a flow diagram illustrating a method for determining whether to forward a notification for a transaction condition variable, according to one embodiment.

One method for determining whether (and where) to forward a notification is illustrated by the flow diagram in FIG. 7. In this example, a transaction A calls a wait method of a transaction condition variable, as in 700. Transaction A may be added to the wait list for the transaction condition variable, as in 710. As described above, in some embodiments a version identifier associated with the transaction condition variable may be incremented in response to the invocation of the wait method, and transaction A may log the transaction condition variable in a list of transaction condition variables on which it has waited. Transaction A may then be suspended pending notification.

When a transaction B calls a notify method of the transaction condition variable (as in 720), it may notify transaction A. As described above, transaction B may log the value of the version identifier for the transaction condition variable (i.e. its value at the time of the notification) in the list of transaction condition variables on which transaction A has waited, and transaction A may resume execution (as in 730). Subsequently, if transaction B aborts, shown as the positive exit from 740, transaction A (being dependent on transaction B, which was its notifier), must also abort (as in 745). If transaction B does not abort, but successfully commits (shown as the negative exit from 740), transaction A may attempt to commit. If this attempt to commit transaction A is successful (i.e. if transaction A does not abort), shown as the negative exit from 750, transaction A may commit, as in 755.

If the attempt to commit transaction A is unsuccessful (i.e. if transaction A aborts), shown as the positive exit from 750, the method may include determining whether there are any other transactions waiting for a notification for the transaction condition variable that were waiting at the time transaction A received its notification, as in 760. For example, if the version identifier value logged by another one of the transactions on the wait list for the transaction condition variable indicates that the other transaction was waiting on notification for the transaction condition variable when transaction A received its notification (e.g., if the version number logged by the other transaction is lower than that logged on behalf of transaction A by transaction B upon notification), the notification received by transaction A may be forwarded to the other transaction, as in 770. In this case, the given transaction may also be made dependent on transaction B, which was the original notifier. If there are no waiters on the wait list for the transaction condition variable that have been waiting that long, shown as the negative exit from 760, the notification may be dropped, rather than forwarded, as in 765.

Some condition synchronization idioms may require a notifier to determine whether there are any waiters on a condition variable, in order to make a decision about whether to notify on that condition variable. Although straightforward in the non-transactional context, this idiom can potentially be problematic for transaction condition variables, at least as they have been described so far. In one example, the following pseudocode may represent a waiter:

```
atomic {
    ...
    txcommatomic {
        if (!canProceed) {
            waitersCntr++;
            X.txwait( );
        }
        // disallow another waiter from moving forward
        //
        canProceed = false;
    }
    ...
}
```

In this example, both canProceed and waitersCntr are communicator objects, and X is a transaction condition variable (or xCondition). In this example, the following pseudocode may represent a notifier:

```
atomic {
    ...
    txcommatomic {
        if (!canProceed) {
            canProceed = true;
            if (waitersCntr != 0) {
                X.txnotify( );
            }
        }
    }
    ...
}
```

This programming idiom may be typical for single-producer, multiple-consumer applications. However, because of the semantics of communicators and transaction condition variables, the notifier, which reads waitersCntr, may be designated as being dependent on all of the transaction that waiter on X. This can lead to potential deadlocks in single-producer multiple-consumer applications. For example, the notifier (producer) may wake up only one waiter (consumer), and in the process may get stuck behind the remaining waiters (consumers). The waiters, on the other hand, may be stuck waiting for the notifier (producer) to return with more notifications. To handle such scenarios, a waiter indicator operation may be provided on transaction condition variables. This operation, which is invoked in the pseudocode below as the method hasWaiter, and which operates on a given xCondition, may return a flag that indicates whether there might exist one or more waiters waiting on that transaction condition variable. In various embodiments, the hasWaiter method avoids returning the exact number of waiters (e.g., the value of a "waiters counter"), and making guarantees about the existence of waiters. Both options would entail information flow from the waiters to the notifier, which could lead to the notifier being made dependent on the waiters. In some embodiments, if the hasWaiter method returns true, this may means that there may or may not be waiter(s) waiting on the corresponding xCondition. On the other hand, a return value of false may guarantee that there are no waiters waiting on the xCondition at the time. The hasWaiter method may eliminate the need for waitersCntr in the above example, and the notifier's code may be changed to the following:

```
atomic {
    ...
    txcommatomic {
        if (!canProceed) {
            canProceed = true;
```

```
            if (X.hasWaiter( )) {
                X.txnotify( );
            }
        }
    }
    ...
}
```

Another example in which the hasWaiter method may be applied is an application in which a master thread generates tasks and posts them in a queue, and various worker threads pick these tasks from the queue for processing. While posting a task in the queue, the master thread may always check to see if there are any workers waiting to process a task. If there are none, the master may spawn a new worker thread. Knowing that there exists at least one worker waiting on the queue may avoid unnecessary spawning of new worker threads. If the master calls the hasWaiter method and it returns true, the master thread will not spawn a new worker thread, thus saving a key computation resource (e.g., a thread). In this example, the queue operations may be performed within a transaction, and the queue may be built using communicator objects for scalability.

Figure 8:
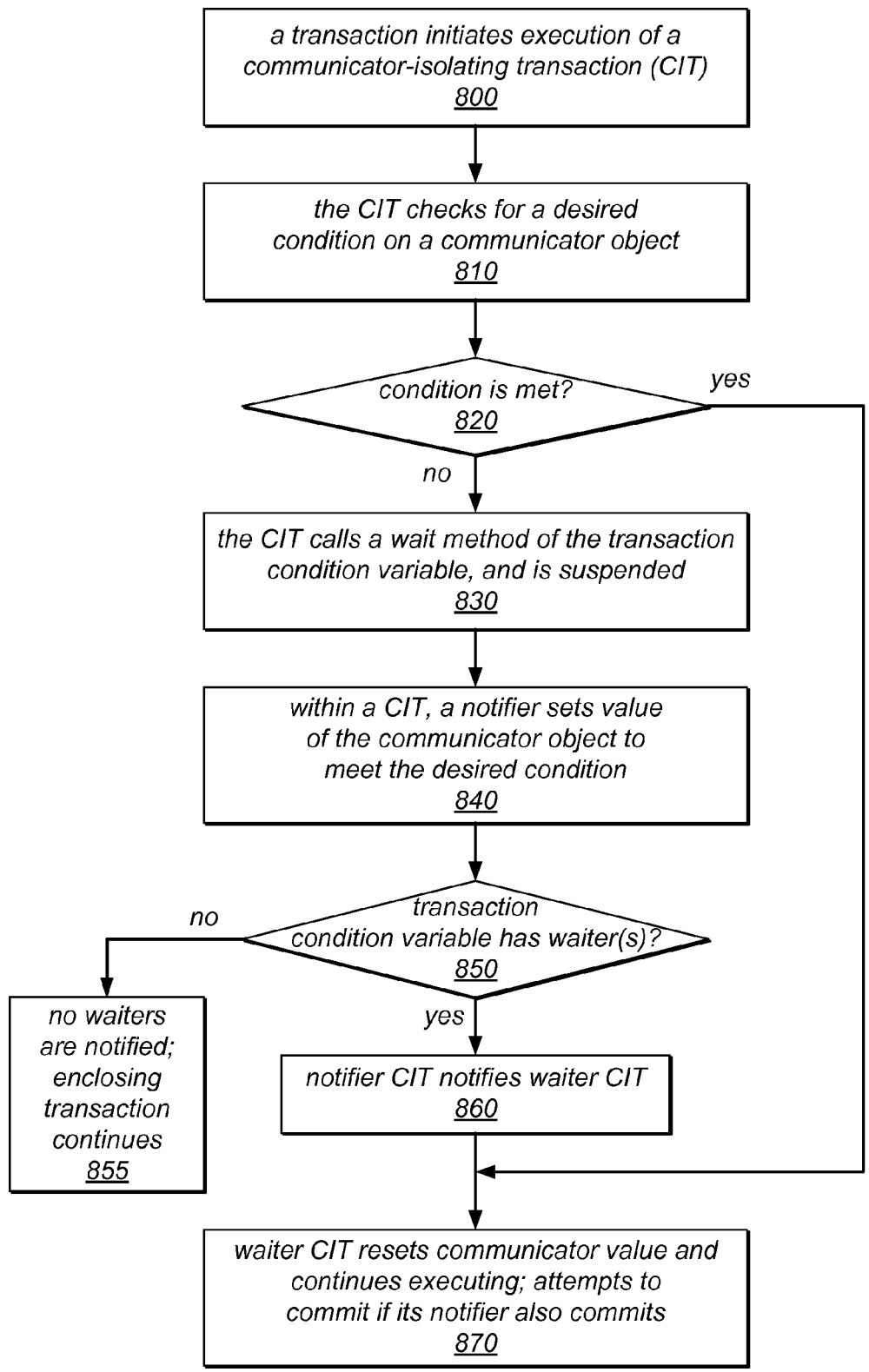
FIG. 8 is a flow diagram illustrating a method for using transaction condition variables and communicator objects that includes a waiter indication operation, according to one embodiment.

The use of a waiter indication (e.g., a hasWaiter method) in a method for using transaction condition variables and communicator objects is illustrated in the flow diagram in FIG. 8, according to one embodiment. In this example, a transaction initiates execution of a communicator-isolating transaction (CIT) nested within the transaction, as in 800. The CIT checks for a desired condition on a communicator object, as in 810. For example, the CIT may read a value of the communicator object to determine whether it is an expected or desired value. If the condition is met, shown as the positive exit from 820, the CIT may reset the communicator object value, continue execution, and may eventually attempt to commit, as in 870. As described above, resetting the communicator object value to a value other than that which meets the desired condition may keep other waiters from advancing in response to detecting this same condition. In this case, since the CIT did not invoke a wait method of a transaction condition variable, it is not dependent on any notifier transactions.

In the example illustrated in FIG. 8, if the desired condition on the communicator object is not met, shown as the negative exit from 820, the CIT may call a wait method of a transaction condition variable, and may be suspended pending a corresponding notification, as in 830. In some embodiments, it may actually be the CIT that aborts, and the enclosing waiter transaction that is suspended. This may be thought of as the CIT being suspended, and the CIT aborting and retry immediately after it is notified. At some point subsequent to the CIT of the waiter transaction invoking the wait method, a notifier transaction may, within a CIT that conditionally calls a notify method of the transaction condition variable (e.g., a CIT nested within the notifier transaction), set the value of the communicator object to a value that meets the desired condition, as in 840. Note that in other embodiments, the value of the communicator object may be set outside the CIT. If, by this time, the transaction condition variable no longer has any waiters, shown as the negative exit from 850, no transactions may be notified of the notification event, and the enclosing transaction may continue, as in 855. If, at this point, the transaction condition variable has one or more waiters, shown as the positive exit from 850, the notifier CIT may notify one of the waiters (e.g., it may notify the CIT that invoked the wait method), as in 860. In some embodiments, the notifier transaction may call the hasWaiter method for the transaction condition variable to determine whether it has any waiters, and if it returns true, it may notify one of the waiters. However, if another transaction has already notified the waiter transaction (and/or any other waiter transactions for the transaction condition variable) between the time that the waiter transaction(s) invoked the wait method and the time that the given notifier transaction invoked the hasWaiter method, it may return false.

In some embodiments, since the communicator object now includes the value that meets the desired condition, the waiter CIT may detect that the condition is met, reset the communicator object value, continue execution, and eventually attempt to commit (if its notifier also commits), as in 870. Again, resetting the communicator object value to a value other than that which meets the desired condition may keep other waiters from advancing in response to detecting this same condition. In this case, since the CIT invoked a wait method of the transaction condition variable, it is dependent on the corresponding notifier transaction. Note that while the example flow diagram in FIG. 8 does not illustrate the "retry-on-wait" technique described herein, that technique may in some embodiments also be applied in conjunction with in the illustrated example. In such embodiments, the waiting CIT may be aborted and retried one or more times until the desired condition is observed in the communicator object, and may be dependent only on the last notifier transaction.

The systems and methods described herein may in various embodiments facilitate mechanisms for condition synchronization between concurrent transactions that, instead of aborting or committing a waiting transaction as in prior proposals, enforces dependencies between waiter and notifier transactions (e.g., such that waiter transactions always depending on corresponding notifier transactions). The dependency relation being transitive, circular dependencies can form, and may force the participant transactions to commit or abort together. The illustrative examples provided herein demonstrate that the transaction condition variable (sometimes referred herein as the xCondition), may be used effectively, e.g., in conjunction with communicators, to help programmers easily express programming idioms that require synchronous communication between concurrent transactions, a feature that prior proposals did not provide.

Various embodiments described herein may inter-operate with a wide variety of Software Transactional Memory (STM) runtimes, ranging from early indirection based STMs to the most recent state-of-the-art managed language and unmanaged language STMs. In some embodiments, the systems described herein may operate in an object-oriented environment, such as an environment based on the Java™ programming language.

Figure 9:
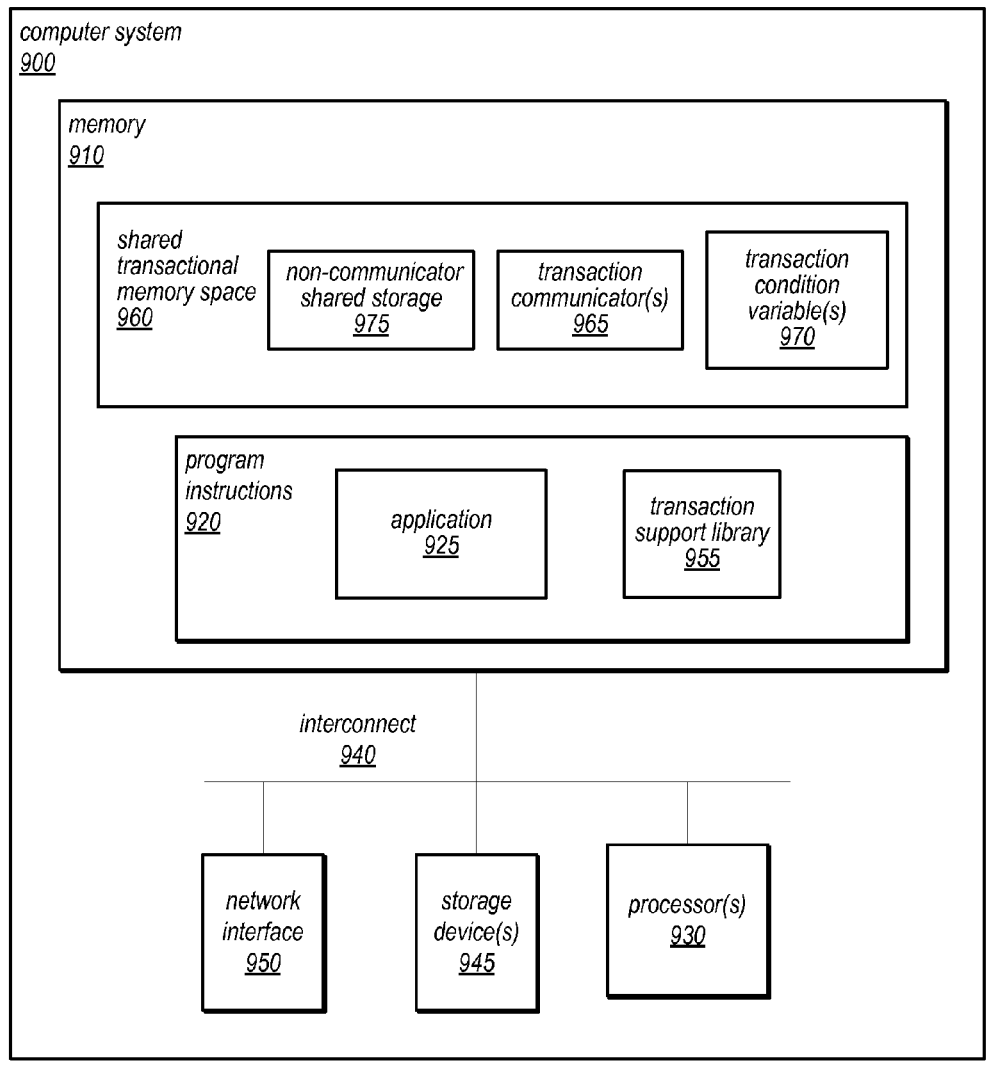
FIG. 9 is a block diagram of a computer system configured to execute transactions that communicate with each other through transaction communicator objects and/or transaction condition variables, according to various embodiments.

The techniques described herein for executing transactions that communicate with each other through transaction communicator objects and/or transaction condition variables may be implemented in any of a wide variety of computing systems. FIG. 9 illustrates a computing system configured to execute transactions that communicate with each other through transaction communicator objects and/or transaction condition variables, as described herein and according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. In various embodiments, computer system 900 may comprise transactional memory mechanisms for implementing transactional memory in hardware. In various embodiments, transactional memory may be implemented in hardware, in software, or using a combination thereof. Transactional memory implementations may provide a "begin transaction", "atomic" or similar instruction, and a "commit", or similar instruction, to explicitly indicate the beginning and end of a given transaction respectively, as described herein. In some embodiments, a language-level "txcommatomic" modifier may be used to designate atomic blocks that isolate accesses to transaction communicator objects and/or transaction condition variables, as described herein.

The described methods may in some embodiments be provided as a computer program product, or software, that may include a non-transitory, computer-readable storage medium having stored thereon instructions, which may be used to program computer system 900 (and/or other electronic devices) to execute transactions that communicate with each other through transaction communicator objects and/or transaction condition variables, as described herein. A non-transitory, computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In other embodiments, program instructions executable to perform the methods described herein may be communicated using optical, acoustical or other form of propagated signal (e.g., carrier waves, infrared signals, digital signals, etc.).

A computer system 900 may include one or more processors 930 (each of which may be a single-threaded processor, a multi-threaded processor, a multi-core processor, etc.). Each processor may comprise more than one logical processor, for example, in systems supporting simultaneous multi-threading (SMT). In computer system 900, each processor 930 may comprise one or more hardware cache coherence mechanisms. However, in various embodiments, cache coherence mechanisms may also be implemented in software, or in both hardware and software simultaneously. These mechanisms and protocols may insure coherence between caches, for example, according to MESI or MOESI protocols.

The computer system 900 may also include one or more system memories 910 (e.g., one or more of cache, SRAM, DRAM, RDRAM, EDO RAM, DDR RAM, SDRAM, Rambus RAM, EEPROM, etc.), a system interconnect 940 (e.g., LDT, PCI, ISA, etc.), a network interface 950 (e.g., an ATM interface, an Ethernet interface, a Frame Relay interface, etc.), and one or more persistent storage device(s) 945 (e.g., optical storage, magnetic storage, hard drive, tape drive, solid state memory, etc.). The memory medium may include other types of memory as well, or combinations thereof. In other embodiments, computer system 900 may include fewer or additional components not illustrated in FIG. 9 (e.g., video cards, audio cards, additional network interfaces, peripheral devices, a network interface such as an ATM interface, an Ethernet interface, a Frame Relay interface, or other devices). The processor (s) 930, the storage device(s) 945, the network interface 950, and the system memory 910 may be coupled to system interconnect 940 and may communicate with each other through system interconnect 940. In general, interconnect 940 may be implemented as any broadcast, point-to-point, or hybrid communication mechanism such as a front side bus, Ethernet, InfiniBand™, etc.

In some embodiments, system memory 910 may include program instructions 920, which may include a transaction support library 955. Program instructions 920 may also include a compiled application 925, which may include executable program code specifying one or more atomic transactions that perform accesses to one or more transaction communicator objects and/or transaction condition variables, and which may include calls to functions of transaction support library 955, which may be configured to provide various methods for implementing atomic transactions (including communicator-isolating transactions), as described herein. In some embodiments, class definitions for transaction communicator objects and/or transaction condition variables may be included in transaction support library 955.

Application 925 and transaction support library 955 may each be implemented in any of various programming languages or methods. For example, application 925 and transaction support library 955 may be encoded in platform native binary, any interpreted language such as Java™ bytecode, or in any other language such as C/C++, the Java™ programming language, etc., or any combination thereof, in different embodiments. Moreover, in some embodiments, transaction support library 955, and application 925 may not be implemented using the same programming language. For example, application 925 may be C++ based, while transaction support library 955 may be developed using C.

As illustrated in FIG. 9, memory 910 may also include a shared transactional memory space 960, which may support and/or be accessed by transactions in a software transactional memory implementation, a hardware transactional memory implementation, and/or a hardware-software hybrid transactional memory implementation, in different embodiments. In some embodiments, shared transactional memory space 960 may comprise memory locations for storing shared variables and other data structures, including some of all of those described herein. For example, memory 910 and/or shared transactional memory space 960 may include one or more storage locations configured to store one or more transaction communicators 965, one or more transaction condition variables 970, and/or one or more non-communicator shared objects 975. In various embodiments, other types of data structures may be stored in shared transactional memory space 960, such as one or more transaction descriptors (not shown). In other embodiments, these and/or other shared variables and data structures may be stored in user memory on one or more of persistent storage device(s) 945.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:
1. A method, comprising:
 performing, by a computer:
  executing a plurality of concurrent transactions, wherein the plurality of concurrent transactions comprises a waiter transaction and a notifier transaction;

the waiter transaction invoking a wait method of a transaction condition variable, wherein invoking the wait method creates a one-way dependency between the waiter transaction and the notifier transaction such that the waiter transaction cannot commit until the notifier transaction commits but the notifier transaction is not dependent on the waiter transaction, wherein the transaction condition variable is a condition variable for which transaction isolation has been relaxed so that the waiter transaction and the notifier transaction can communicate through the transaction condition variable;

suspending execution of the waiter transaction pending notification of a notification event from a notify method of the transaction condition variable;

the notifier transaction invoking the notify method of the transaction condition variable, wherein the notify method notifies the waiter transaction of a notification event; and in response to receiving the notification of the notification event, the waiter transaction:
resuming execution; and
in response to determining that the notifier transaction has successfully committed, attempting to commit the waiter transaction.

2. The method of claim 1, wherein the wait method performs adding the waiter transaction to a list of transactions that are waiting for notification from a notify method of the transaction condition variable.

3. The method of claim 1, further comprising:
the waiter transaction failing to commit; and
in response to the waiter transaction failing to commit, forwarding the notification of the notification event to another waiter transaction of the plurality of concurrent transactions that is waiting for notification from a notify method of the transaction condition variable.

4. The method of claim 1,
wherein the wait method is performed using a communicator-isolating transaction nested within the waiter transaction;
wherein the notify method is performed using a communicator-isolating transaction nested within the notifier transaction;
wherein a communicator-isolating transaction is a transaction that ensures isolation of accesses to transaction communicator objects by the communicator-isolating transaction;
wherein the transaction condition variable is a transaction communicator object; and
wherein a transaction communicator object is a shared object that is accessible by concurrent transactions and through which concurrent transactions can communicate.

5. The method of claim 1, further comprising:
prior to said invoking the wait method, the waiter transaction evaluating a condition of a transaction communicator object, wherein a transaction communicator object is a shared object that is accessible by concurrent transactions and through which concurrent transactions can communicate; wherein the transaction condition variable is a transaction communicator object; and
wherein said invoking the wait method is performed in response to determining that the condition is not met.

6. The method of claim 1, wherein the notifier method performs:

removing the waiter transaction from a list of transactions that are waiting for notification from a notify method of the transaction condition variable; and
scheduling the waiter transaction for resumed execution.

7. The method of claim 1, wherein said resuming execution comprises evaluating a condition of a transaction communicator object, wherein a transaction communicator object is a shared object that is accessible by concurrent transactions and through which concurrent transactions can communicate; and wherein the transaction condition variable is a transaction communicator object.

8. The method of claim 7, further comprising:
in response to determining that the condition is not met, the waiter transaction invoking the wait method of the transaction condition variable a second time.

9. The method of claim 8,
wherein said resuming execution comprises aborting and retrying a communicator-isolating transaction that performs the wait method; and
wherein said attempting to commit is performed in response to determining that the most recent notifier transaction has successfully committed.

10. The method of claim 1, further comprising:
the notifier method invoking a waiter indicator method of the transaction condition variable, wherein the waiter indicator method performs determining whether there are any transactions waiting for notification from a notify method of the transaction condition variable;
wherein said invoking the notify method is performed in response to determining that there is at least one transaction waiting for notification from a notify method of the transaction condition variable.

11. A system comprising:
one or more processors; and
memory coupled to the one or more processors and storing program instructions that when executed by the one or more processors cause the one or more processors to perform:
executing a plurality of concurrent transactions, wherein the plurality of concurrent transactions comprises a waiter transaction and a notifier transaction;
the waiter transaction invoking a wait method of a transaction condition variable, wherein invoking the wait method creates a one-way dependency between the waiter transaction and the notifier transaction such that the waiter transaction cannot commit until the notifier transaction commits but the notifier transaction is not dependent on the waiter transaction, wherein the transaction condition variable is a condition variable for which transaction isolation has been relaxed so that the waiter transaction and the notifier transaction can communicate through the transaction condition variable;
suspending execution of the waiter transaction pending notification of a notification event from a notify method of the transaction condition variable;
the notifier transaction invoking the notify method of the transaction condition variable, wherein the notify method notifies the waiter transaction of a notification event; and
in response to receiving the notification of the notification event, the waiter transaction:
resuming execution; and
in response to determining that the notifier transaction has successfully committed, attempting to commit the waiter transaction.

12. The system of claim 11, wherein when executed by the one or more processors, the program instructions further cause the one or more processors to perform:
in response to the waiter transaction failing to commit, forwarding the notification of the notification event to another waiter transaction of the plurality of concurrent transactions that is waiting for notification from a notify method of the transaction condition variable.

13. The system of claim 11,
wherein the wait method is performed using a communicator-isolating transaction nested within the waiter transaction;
wherein the notify method is performed using a communicator-isolating transaction nested within the notifier transaction;
wherein a communicator-isolating transaction is a transaction that ensures isolation of accesses to transaction communicator objects by the communicator-isolating transaction;
wherein the transaction condition variable is a transaction communicator object; and
wherein a transaction communicator object is a shared object that is accessible by concurrent transactions and through which concurrent transactions can communicate.

14. The system of claim 11,
wherein the wait method performs adding the waiter transaction to a list of transactions that are waiting for notification from a notify method of the transaction condition variable; and
wherein the notifier method performs:
removing the waiter transaction from the list of transactions that are waiting for notification from a notify method of the transaction condition variable; and
scheduling the waiter transaction for resumed execution.

15. The system of claim 11,
wherein said resuming execution comprises evaluating a condition of a transaction communicator object, wherein a transaction communicator object is a shared object that is accessible by concurrent transactions and through which concurrent transactions can communicate;
wherein the transaction condition variable is a transaction communicator object; and
wherein when executed by the one or more processors, the program instructions further cause the one or more processors to perform:
in response to determining that the condition is not met, the waiter transaction invoking the wait method of the transaction condition variable a second time.

16. The system of claim 15,
wherein said resuming execution comprises aborting and retrying a communicator-isolating transaction that performs the wait method.

17. A non-transitory, computer readable storage medium storing program instructions that when executed by one or more computers cause the one or more computers to perform:
executing a plurality of concurrent transactions, wherein the plurality of concurrent transactions comprises a waiter transaction and a notifier transaction;
the waiter transaction invoking a wait method of a transaction condition variable, wherein invoking the wait method creates a one-way dependency between the waiter transaction and the notifier transaction such that the waiter transaction cannot commit until the notifier transaction commits but the notifier transaction is not dependent on the waiter transaction, wherein the transaction condition variable is a condition variable for which transaction isolation has been relaxed so that the waiter transaction and the notifier transaction can communicate through the transaction condition variable;
suspending execution of the waiter transaction pending notification of a notification event from a notify method of the transaction condition variable;
the notifier transaction invoking the notify method of the transaction condition variable, wherein the notify method notifies the waiter transaction of a notification event; and
in response to receiving the notification of the notification event, the waiter transaction:
resuming execution; and
in response to determining that the notifier transaction has successfully committed, attempting to commit the waiter transaction.

18. The storage medium of claim 17, wherein when executed by the one or more computers, the program instructions further cause the one or more computers to perform:
in response to the waiter transaction failing to commit, forwarding the notification of the notification event to another waiter transaction of the plurality of concurrent transactions that is waiting for notification from a notify method of the transaction condition variable.

19. The storage medium of claim 17,
wherein the notifier method performs scheduling the waiter transaction for resumed execution;
wherein said resuming execution comprises evaluating a condition of a transaction communicator object, wherein a transaction communicator object is a shared object that is accessible by concurrent transactions and through which concurrent transactions can communicate; and
wherein when executed by the one or more computers, the program instructions further cause the one or more computers to perform:
in response to determining that the condition is not met, the waiter transaction invoking the wait method of the transaction condition variable a second time.

20. The storage medium of claim 19,
wherein said resuming execution comprises aborting and retrying a communicator-isolating transaction that performs the wait method.

* * * * *